(12) United States Patent
Bows et al.

(10) Patent No.: US 7,867,533 B2
(45) Date of Patent: Jan. 11, 2011

(54) PROCESS FOR MAKING A HEALTHY SNACK FOOD

(75) Inventors: John Richard Bows, Lutterworth (GB);
Colin Jeffrey Burnham, Quorn (GB);
David Lester Hickie, Market Harborough (GB); Greg Paul Hilliard, Coventry (GB); Michelle Louise Lock, Bury St Edmunds (GB); Brian Richard Newberry, Leicestershire (GB)

(73) Assignee: Frito-Lay Trading Compnay GmbH (CH)

( * ) Notice: Subject to any disclaimer, the term of this patent is extended or adjusted under 35 U.S.C. 154(b) by 925 days.

(21) Appl. No.: 11/686,027

(22) Filed: Mar. 14, 2007

(65) Prior Publication Data

US 2008/0026118 A1 Jan. 31, 2008

Related U.S. Application Data

(63) Continuation-in-part of application No. 11/458,592, filed on Jul. 19, 2006.

(51) Int. Cl.
*A23L 1/01* (2006.01)
(52) U.S. Cl. .................. 426/232; 426/233; 426/242; 426/243; 426/637; 426/438; 426/439; 426/465; 426/523
(58) Field of Classification Search ......... 426/231–233, 426/241–243, 438–439, 465–466, 523, 104, 426/637
See application file for complete search history.

(56) References Cited

U.S. PATENT DOCUMENTS

| | | | |
|---|---|---|---|
| 2,091,372 A | 8/1937 | Moore | |
| 2,110,184 A | 3/1938 | Webb | |
| 3,355,299 A | 11/1967 | McLaughlin et al. | |
| 3,365,301 A | 1/1968 | Lipoma et al. | |
| 3,650,973 A | 3/1972 | Maeder et al. | |
| 4,073,952 A | 2/1978 | Standing et al. | |
| 4,277,510 A | 7/1981 | Wicklund et al. | |
| 4,283,425 A | 8/1981 | Yuan et al. | |
| 4,471,195 A | 9/1984 | Ishii et al. | |
| 4,488,027 A | 12/1984 | Dudley et al. | |
| 4,608,262 A | 8/1986 | Galland | |
| 4,664,924 A | 5/1987 | Sugisawa et al. | |

(Continued)

FOREIGN PATENT DOCUMENTS

CA 1151945 A 8/1983

(Continued)

*Primary Examiner*—Drew E Becker
(74) *Attorney, Agent, or Firm*—Colin P. Cahoon; Carstens & Cahoon, LLP

(57) ABSTRACT

The present invention is directed towards a method for making a healthy snack food having an appearance and taste similar to conventional fried snack products without the use of an oil-frying process. The method of the present invention includes the steps of providing food slices from a starch-based food or dough. The food slices can be blanched and a controlled amount of oil can be added to enhance final organoleptical properties. The food slices are then rapidly dehydrated to a much lower moisture content in a primary drying step that simulates conventional frying dehydration rates. A food snack, such as a corn or potato-based snack, produced by this method is a low-fat, ready-to-eat snack having the conventional texture and taste associated with fried snack products.

30 Claims, 7 Drawing Sheets

U.S. PATENT DOCUMENTS

| | | | |
|---|---|---|---|
| 4,707,370 A * | 11/1987 | Kakis | 426/443 |
| 4,714,813 A | 12/1987 | Trenchard | |
| 4,721,625 A | 1/1988 | Lee et al. | |
| 4,746,968 A | 5/1988 | Wear et al. | |
| 4,756,916 A | 7/1988 | Dreher et al. | |
| 4,800,090 A | 1/1989 | August | |
| 4,803,090 A | 2/1989 | Schlipalius et al. | |
| 4,873,093 A | 10/1989 | Fazzolare et al. | |
| 4,906,483 A | 3/1990 | Kloos | |
| 4,933,199 A | 6/1990 | Neel et al. | |
| 4,948,609 A | 8/1990 | Nafisi-Movaghar | |
| 4,950,492 A | 8/1990 | Shachat et al. | |
| 5,000,972 A | 3/1991 | Nafisi-Movaghar | |
| 5,180,601 A | 1/1993 | Gaon et al. | |
| 5,188,859 A | 2/1993 | Lodge et al. | |
| 5,202,139 A | 4/1993 | Gaon et al. | |
| 5,204,133 A | 4/1993 | Hibbs et al. | |
| 5,292,540 A | 3/1994 | Laufer | |
| 5,298,707 A | 3/1994 | Sprecher et al. | |
| 5,392,698 A | 2/1995 | Sprecher et al. | |
| 5,393,543 A | 2/1995 | Laufer | |
| 5,425,308 A | 6/1995 | Dickerson et al. | |
| 5,500,240 A | 3/1996 | Addesso et al. | |
| 5,560,287 A * | 10/1996 | Petelle et al. | 99/451 |
| 5,643,626 A * | 7/1997 | Henson et al. | 426/438 |
| 5,645,876 A | 7/1997 | Subramaniam et al. | |
| 5,676,989 A * | 10/1997 | Durance et al. | 426/242 |
| 5,690,982 A | 11/1997 | Fazzolare et al. | |
| 5,718,935 A | 2/1998 | Laufer | |
| 5,858,431 A | 1/1999 | Wiedersatz | |
| 5,902,510 A | 5/1999 | Balbaa et al. | |
| 5,956,865 A | 9/1999 | Durance et al. | |
| 5,961,870 A | 10/1999 | Hogan | |
| 5,962,057 A | 10/1999 | Durance et al. | |
| 5,972,397 A | 10/1999 | Durance et al. | |
| 6,025,580 A | 2/2000 | Yagi | |
| 6,104,015 A | 8/2000 | Jayan et al. | |
| 6,172,346 B1 | 1/2001 | Wroe | |
| 6,251,465 B1 | 6/2001 | Bello et al. | |
| 6,350,973 B2 | 2/2002 | Wroe et al. | |
| 6,546,646 B1 | 4/2003 | Thomas | |
| 6,572,910 B2 | 6/2003 | Lanner et al. | |
| 6,884,449 B2 | 4/2005 | Lee et al. | |
| 7,029,716 B2 | 4/2006 | Margolis | |

FOREIGN PATENT DOCUMENTS

| | | |
|---|---|---|
| DE | 3233819 A1 | 3/1984 |
| WO | 92/21250 | 12/1992 |
| WO | 94/15481 | 7/1994 |
| WO | 03/103407 | 12/2003 |
| WO | 20041047542 A1 | 6/2004 |

* cited by examiner

PROCESS FOR MAKING A HEALTHY SNACK FOOD

This application is a continuation-in-part of prior application Ser. No. 11/458,592, filed Jul. 19, 2006.

BACKGROUND OF THE INVENTION

1. Technical Field

The present invention relates to an improved method for producing shelf-stable snack foods and especially low oil snack foods. More specifically, the present invention relates to a method whereby a unique combination of unit operations are used to produce a low-fat potato crisp having organoleptical properties similar to those of traditional fried potato crisps.

2. Description of Related Art

Conventional potato crisp products are prepared by the basic steps of slicing peeled, raw potatoes, water washing the slices to remove surface starch, and frying the potato slices in hot oil until a moisture content of about 1-2% by weight is achieved. The fried slices can then be salted or seasoned and packaged.

Raw potato slices normally have a moisture content from about 75% to about 85% by weight depending on the type of potato and the environmental growing conditions. When potato slices are fried in hot oil, the moisture present boils. This results in burst cell walls and the formation of holes and voids which allow for oil absorption into the potato slices yielding oil contents ranging from about 30% to about 45% by weight.

The oil content of potato crisps is important for many reasons. Most important is its contribution to the overall organoleptic desirability of potato crisps, however, from the standpoint of good nutrition, it is desirable to maintain a low level of oil or fat in potato crisps. Many health conscious consumers desire a low fat alternative to the traditional fried crisp having minimal taste differences from the fried product. Further, a high oil content renders the crisps greasy or oily and hence less desirable to the consumer. Numerous attempts have been made in the prior art to reduce the oil content in potato crisps. Many attempts involve thermally processing the potato slices in an oven or a microwave to avoid the addition of oil to the potato crisp.

For example, U.S. Pat. No. 5,292,540 claims a process for preparing potato crisps by first pre-baking the potato slices at a temperature of between about 121° C. to about 260° C. (250° F. to 500° F.) to remove about 50% to about 80% of the moisture in the slice prior to microwave heating the potato slices.

Similarly, U.S. Pat. Nos. 5,180,601; 5,202,139; and 5,298,707 all relate to a method and apparatus for producing fat-free snack crisps. For example, U.S. Pat. No. 5,298,707 discloses a first intensive microwave pre-baking step that reduces the moisture content in the potato to about 25% to about 30% by weight. The '707 patent employs a special intermittent microwave field provided by a meandering wave guide and a special conveyor belt to reduce the problems of hard surface and texture. However, according to U.S. Pat. No. 5,676,989, the approach disclosed in U.S. Pat. No. 5,298,707, still produces an undesirable, relatively dense, hard crisp. Similarly, nearly all of the prior art processes result in a low fat snack food having organoleptical properties far less desirable than the fried potato crisp counterpart. Thus, none of the prior art solutions have succeeded in mimicking the taste and texture of fried potato crisps.

Consequently, a need exists to provide an economical method for making reduced oil potato crisps having desirable organoleptical properties similar to traditional potato crisps.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of the illustrative embodiments when read in conjunction with the accompanying drawings wherein:

DETAILED DESCRIPTION

Figure 1:
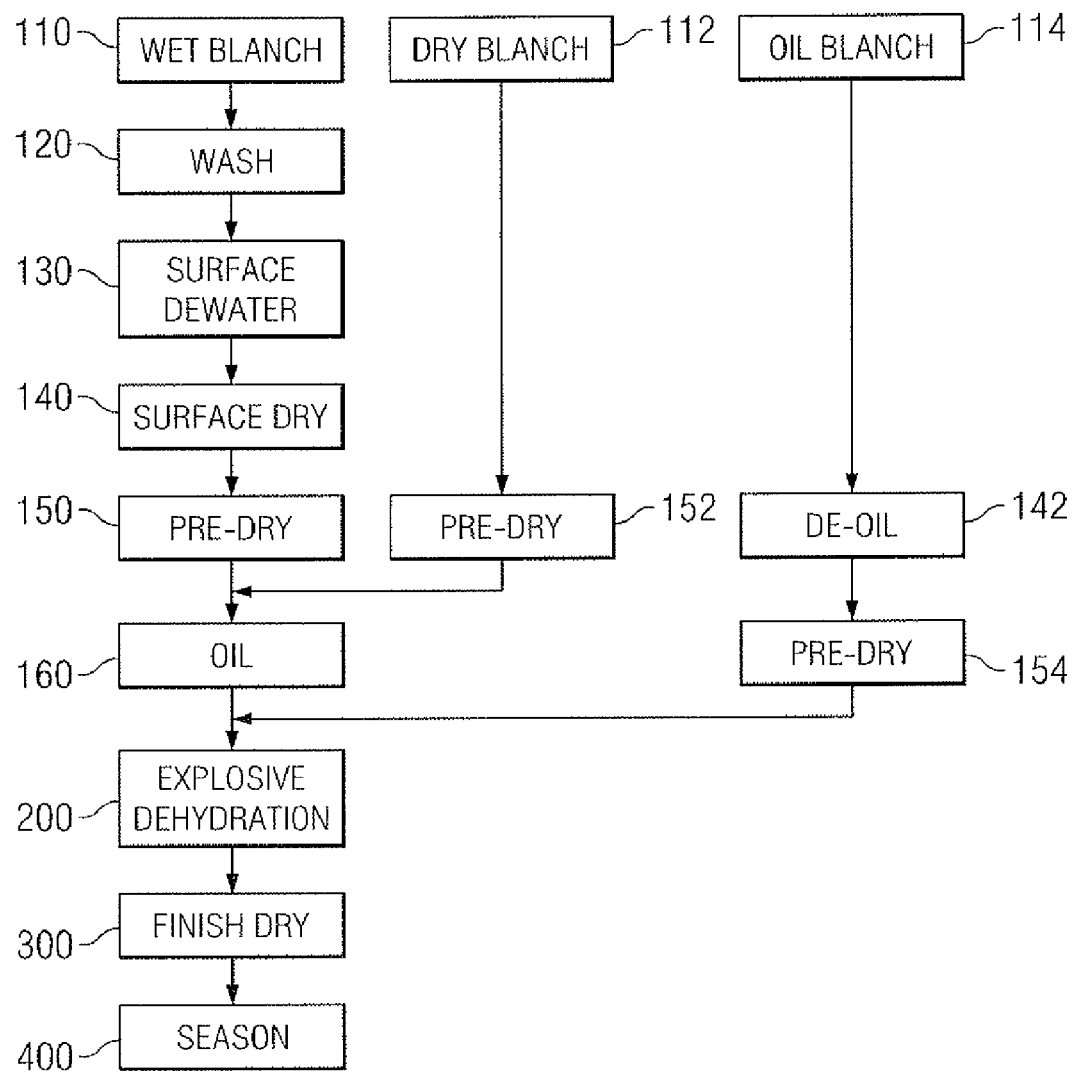
FIG. 1 is a flow chart representation depicting numerous embodiments of the present invention.

FIG. 1 is a flow chart representation depicting the preparation steps of raw food-based slices in accordance with numerous embodiments of the present invention. The preferred sources of food substrates or slices are cereal grains (e.g., corn, waxy corn, oats, wheat, sorghum, rice, oats, millet, rye, barley, and waxy rice), pulses (e.g. kidney beans, pinto beans, lentils, chickpea), tubers (i.e., potato, Jerusalem artichoke, yam), fruit, vegetables, and roots (i.e., tapioca, yucca, tarot, sweet potato, beet, carrot, arrowroot, cassava, parsnip). In one embodiment of the present invention, potatoes of the chipping variety can be used. Potatoes of the chipping variety that can be used include, but are not limited to Saturna, Lady Rosetta, Lady Clair, Hermes, Maris Piper, Erntestolz, Agria, Atlantic, Monona, Norchip, Snowden, Kennebec, Oneida, and Tobique. Non-chipping potato varieties can also be used including, but not limited to Marfona, King Edward, Yukon Gold, Desiree, Karlena and Estima. Similarly, French fry varieties such as Russet Burbank, and Bintje can be used. It should be noted that while chipping potatoes typically used for making potato crisps have relatively low levels of reducing sugars, and are not typically used to make French fries or baked potatoes, any potato can be used in accordance with the present invention and the present invention is not limited by physiological or biological make up of the potato.

Although potato slices are used to illustrate this invention, one skilled in the alt armed with the knowledge of this disclosure will recognize that the resultant processing times and temperatures disclosed below may need to be adjusted to compensate for the use of a different starting material. For example, while the present invention is suitable for the preparation of low-fat potato crisps made from potatoes, the present invention is also applicable to a wide variety of food substrates which can be cut or otherwise formed into flat, generally thin slice-shaped portions. The present invention can be used to prepare crisps from raw vegetables, such as potatoes, and the like that have been cut into slices or, alternatively, doughs comprising masa, other raw materials reduced to a formable state, re-hydrated dry ingredients including potato flakes, or other food substrates may be ground into a dough or paste, mixed with other ingredients and additives and then shaped into configurations such as flat slice shapes for preparation into a snack. Consequently, as used herein, the term "food slice" encompasses pre-forms made from a dough.

Similarly, while the present invention is suitable for the preparation of low-fat potato crisps made from sliced potatoes, the resultant processing times and temperatures disclosed below may need to be adjusted to compensate for the use of a different starting material and shape. For example, potatoes can be cut into slices having one or more flat sides or the potatoes can be sliced with one or both ridged sides. One advantage of ridged sliced potatoes is that the slices are less likely to stick together because of the reduced surface tension, which results from a reduced surface area available for contact between the slices. Consequently, less intensive surface drying may be required with a ridged slice. In one embodiment, the potatoes can be cut into wedges or French fry-like sticks of suitable size. In one embodiment, French-fry like sticks have cross-sectional widths of about 5 to about 6 millimeters. In another embodiment, potatoes are cut into slabs of, for example, about 1 to about 3 mm depth, about 50 to about 100 mm length and about 20 to about 50 mm width or other suitable size known in the alt. Because the French-fry like sticks, wedges, and slabs have different geometries, surface area to volume ratios, etc. than slices, the processing times and energies disclosed in each unit operation below may require adjustments. Similarly, if the starting material is further reduced in size (for example by comminution through grating, shredding, ricing, milling or grinding) and then reformed to a dough, pellet, cluster, laminated snack or snack cake comprising the original material and, optionally, a medley of additional ingredients, the resulting food slice can be processed to a desirable snack product under appropriate conditions using the knowledge of this disclosure. Methods for preparing various pre-forms are known in the prior art as exemplified by U.S. Patent Application Publication No. US 2005/0202142, which discloses a method for making a clustered snack product or U.S. Patent Application Publication No. 2002/0142085, which discloses a method for making a potato mash.

In one embodiment, saturna or other suitable potatoes are washed and peeled prior to the slicing step. Although peeling is optional, the peel can contribute to a dominant earthy flavor when the finished food product has low oil content. In one embodiment, the potatoes are sliced to a thickness of between about 1.0 millimeters to about 2.5 millimeters (0.040 inches and about 0.1 inches) in a slicer to provide a plurality of potato slices. Other suitable slice thicknesses may be selected. The potatoes can be dry sliced, sliced in the presence of water, sliced in oil which may provide a desired oil addition to the slice and/or accomplish an oil blanching step. In one embodiment, potato slices are washed in a flume and dewatering belt to remove surface starch, scraps and excess oil, if applied, from the potato slices.

The potato slices are then blanched. If a dough is used, the blanching step may have already occurred at a prior processing stage and additional blanching may not be necessary. If the blanching occurred in a prior processing stage, then the blanching step should be construed to have occurred within the meaning of claimed limitations of the present invention. Further, in a dough-based embodiment, any blanching step is optional. Blanching is only a requirement where the product can benefit from pre-cooking the native starch or de-activating enzymes. Blanching is not necessary for leaching sugars or where native starch is already hydrated or when enzymes have been deactivated in a prior processing step. For example, in one embodiment, steam cooked vegetables such as carrots can be used as the food slice and no further blanching step is necessary. The purpose of the blanching step is to deactivate enzymes such as peroxidase, polyphenol oxidase, and lipoxygenase that can cause undesirable "earthy green" flavors. In one embodiment, blanching can also hydrate the native starch of the food slice. Blanching can be accomplished in a number of ways, including a wet blanch 110, a dry blanch 112 or an oil blanch 114. The blanching medium temperature and dwell time can vary based upon the shape and cross section of the food slice and are preferably such that the potato slices are sufficiently cooked to deliver a clean base flavor, absent of any raw, green taste.

In one embodiment, the slices are dry blanched 112 at a slice temperature of about 90° C. to about 95° C. for about 10 to about 120 seconds and more preferably for about 90 to about 100 seconds by a rotary or conveyor infrared dryer or other suitable heating medium. Dry blanching is advantaged for starchy food slices since it avoids the introduction of moisture that may gelatinize starch and create difficulty due to adhesion of the food slice to other slices or surfaces during processing. In one embodiment, dry blanching 112 is performed through conduction, for example using heated conductive rollers or a heated flat ceramic or metal pan that may contact both sides of the slice simultaneously for 10 seconds to 90 seconds depending on the processing temperature in use, which will typically be about 60° C. to 160° C. For thin food slices temperatures of 90° C. to 120° C. are preferred for 30 to 90 seconds. Contacting both sides of the slice simultaneously ensures there is no lift or curl of the food slice away from the conductive surface which can reduce the effectiveness of blanching. Optionally, the plate may comprise a textured metal surface, for example as supplied by RIMEX, or a non stick coating to improve slice handling. At higher temperatures surfaces may be perforated to ease escape of steam. In an alternative embodiment dry blanching is achieved with microwaves or comprises irradiation. Dry blanching 112 of other shapes such as French fry like sticks can require blanching of two to four minutes and selection of appropriate infrared wavelength for adequate penetration of the food slice. After dry blanching 112, the food slices can optionally be pre-dried 152 in a forced air oven to remove some initial water to improve overall process efficiency. The dry blanched 112 slices can then be routed to the oiling step 160, discussed below.

In one embodiment, the food slices are oil blanched 114 by placing the slices into a warm oil flume, a batch or a continuous oil dip. ABCO, LYCO and Heat and Control are examples of manufacturers of commercial blanching equipment, which is commonly used in the food industry that can be adapted in either rotary or linear form to oil blanching described here. A HEATWAVE frying system available from Heat and Control of Hayward, Calif. USA can also be used.

In the prior art, oil blanching is typically done at relative high temperatures, such as 150° C. and above. For example, U.S. Pat. No. 5,204,133 titled "Process for Preparing Sliced Potato Products" and issued on Apr. 20, 1993, discloses an oil blanching temperature of about 360° F., or 182° C., at Column 4, Line 55. Likewise, U.S. Pat. No. 4,608,262 titled "Method of Making Frozen Potato Patties and the Products Formed Thereby" and issued on Aug. 26, 1986, discloses oil blanching temperatures ranging from about 325° F. to about 380° F., and preferably about 350° F. to 370° F., at Column 3, Lines 7-8. What Applicants refer to generally herein as an "oil blanch" is more specifically to Applicants' invention a "warm oil dip." Such warm oil dip is considered to be a time based heat treatment where the heat and time combination is sufficient to inactivate enzymes and to hydrate ('cook') native starch but is below the evaporation temperature of water in the blanching vessel. Therefore, at sea level, standard atmospheric pressure the maximum oil temperature used for Applicants' warm oil dip is about 99.9° C. In one embodiment, the food slices are blanched at a temperature that enables the native starch to be hydrated (fully or partially gelatinized) by the inherent moisture of the potato slice. A final slice temperature of about 70° C. to about 99° C. during a warm of dip of about 60 to about 120 seconds in duration, or more preferably, for a thin food slice, a final slice temperature of about 90° C. to about 95° C. for 90 second dip is sufficient for optimal flavor benefit, slice rigidity and subsequent handling. A warm oil dip oil temperature ranging from about 60° C. to about 99° C. with a warm oil dip duration of between about 30 seconds to about 300 seconds is preferred by Applicants for the processes described herein. More preferable is a warm oil dip oil temperature of about 75° C. to about 99° C. with a duration of about 50 seconds to about 150 seconds. The most preferred ranges for Applicants' warm oil dip are an oil temperature of about 85° C. to about 95° C. for a duration of about 80 seconds to about 100 seconds.

An advantage of oil blanching with a warm oil dip is to preserve minor constituents of the food slice that make important contributions to flavor and color that may be solubilised or otherwise impaired if using classical water or steam blanching. Although no frying is involved, the technique of oil blanching as disclosed here brings the flavor of the finished chip much closer to its fried counterpart when compared to other blanching methods that may be used to produce products with similar oil contents. Applicants' warm oil dip also acts as an oil addition step to the raw slice. Using one of the subsequent de-oiling methods disclosed in this invention the ingress of oil into the food slice during dehydration can be controlled to a specified level. A further advantage of oil blanching with a warm oil dip is to avoid presenting excess water to the starch in the food slice and therefore to minimize gelatinization of surface starch, which can assist with subsequent handling. Even though temperatures are maintained below water evaporation temperatures, oil blanching with a warm oil dip can result in some moisture loss from the food slices. This is thought to be due to free water in or on the food slice being removed into the oil. The amount of water removed will in part be dependant on the amount of free water on the food slice before oil blanching. Therefore, it is preferable to remove as much free water as possible before a food slice enters the blanching step 114.

Surface drying techniques disclosed later in this invention can be applied before oil blanching. Since the blanching temperature is lower than the boiling point of water, water may become suspended or emulsified in the oil. In this situation the processor may elect to use a settling sump or similar device in order to drain the water or divide oil which is circulating so that a portion is routed through an evaporation chamber heated at >100° C.

In one embodiment, the slices are treated by flash frying for a suitable time and temperature to deactivate enzymes in place of oil blanching. Flash frying is considered to be a time based heat treatment where the heat and time combination is sufficient to inactivate enzymes and evaporate a portion of water in the flash frying vessel. Therefore the minimum flash frying temperature is that at which the water inside the potato cell matrix boils, commonly observed to be 100° C. at standard atmospheric pressure. Similar equipment to that used for oil blanching can be used for flash frying. For example, in one embodiment, potato slices are flashed fried for about 7 seconds to about 10 seconds in oil at about 180° C. Alternatively, the potato slices can be flashed fried for about 15 to about 20 seconds in oil having a temperature of about 150° C. to about 160° C. These conditions may be preferred for thicker food slices to ensure adequate heat transfer and slice rigidity for subsequent handling.

More moisture is lost if the oil blanching step 114 is replaced by flash frying. For example, in one embodiment, flash fried slices comprise a moisture content of about 50% to about 55% by weight. Consequently, in one embodiment, about 30% to about 40% of the starting weight of moisture in a potato can be lost when the oil blanching step 114 is replaced by flash flying, which can improve overall process efficiencies. One benefit of flash frying is to simultaneously deactivate enzymes, add a limited amount of oil to the food slice and pre-dry the substrate in one step. Finished chip oil content can be controlled using one of the subsequent deoiling methods disclosed in this invention.

Any oil or fat is suitable for the process disclosed including vegetable oil, animal fats or synthetic oils, for example coconut oil, corn oil, cottonseed oil, palm oil, palm olein, safflower oil, high oleic safflower oil, palm stearin, soybean oil, sunflower oil, mid or high oleic sunflower oil, rape seed oil, lard, tallow, Olestra™, sucrose polyesters, medium chain fatty acids or a blend of different oils. The choice of oil can be used to influence the final flavor and mouth feel of the finished crisp as well as the nutrition profile. Selecting an indigestible oil (e.g. Olestra™) enables the manufacture of snacks with a lower calorific density than conventional snack foods, if combined with a food slice of suitable composition.

The slice can then be de-oiled 142 to the desired level. Oil removal is assisted by the wet and raw to partially cooked nature of the food slice because the oil is principally on the slice surface and has not been substantially absorbed into the slice interior. The slice can be de-oiled directly while hot or cooled to a temperature at or below ambient before de-oiling.

De-oiling can be performed using wet methods. In one embodiment the de-oiling step 142 can occur in a linear steam blancher commercially available from ABCO, where the food slices are transported through a chamber filled with atmospheric pressure steam by a series of steam manifolds above and below the belt. A 20 to 60 second exposure time using this method is sufficient to de-oil a thin food slice to less than 18% oil, less than half the fried counterpart, and typically to around 12% oil in the final chip. Alternatively, the slices can be transported through a perforated rotating drum made from metal or a suitable heat resistant polymer (e.g. polypropylene or PTFE). Steam can be introduced via a manifold inserted along the center of the rotating drum, alternatively the drum can be mounted inside a chamber with circulating steam. Sparging the tumbling slices with steam at 0.7 bar for 20 seconds is sufficient to fully de-oil to 3% or less in the final chip. Mounting an external steam or air knife angled toward the outer circumference of the drum will assist this process step by dislodging any slices that stick to the internal circumference of the drum.

In one embodiment, the de-oiling step 142 can occur by washing in a hot water bath (typically about 50° C. to about 65° C.) or ambient cold water bath (typically about 15° C. to about 25° C.) either of which optionally may contain marinade ingredients. This de-oiling method removes all available surface oil to so that a thin potato slice, which is subsequently dried, will typically contain less than or equal to 3% oil. A model No. PSSW-MCB speed washer available from Heat and Control is one example of a suitable water bath. Similar results are achieved if the water bath is combined with or replaced by a series of pressurized water jets or knives mounted above and below the slices, which are transported on an open weave conveyor that may optionally use an upper hold down conveyor. The advantage of water jets is to provide more control over de-oiling through variables such as water pressure, angle of water knife and exposure time.

Slices from de-oiling involving wet media can be further processed using the surface drying and pre-drying methods disclosed later in this invention. However, for some food slices the processor may find it preferable to use a de-oiling method that minimizes or fully eliminates the exposure of the food slice to wet steam or water. De-oiling in this way can avoid product handling issues that occur when starch on the surface of a food slice becomes sticky due to gelatinization in the presence of heat and water or condensate.

Therefore de-oiling 142 can be achieved on a linear drain belt which may optionally be assisted by blowing ambient, warm or hot air onto the food slice surfaces. This method can be demonstrated by the use of a hot air paint stripping gun available at most hardware stores. Air temperatures above 120 C are most efficient at removing oil with typical airflow rates of 4.5 to 5.5 m/s. High temperatures (e.g. 180 C to 200 C) can cause surface damage or excessive drying to the food slice and should therefore be avoided. Air temperature, air velocity at the slice surface, exposure time and angle of impingement can all be used as variables to control the amount of oil removed. An exposure time of 5 to 90 seconds or preferably 10 to 20 seconds and an impingement angle close to 90 degrees is preferred for effectiveness of oil removal and ease of product handling. Humidification of the air can further assist the de-oiling process provided the surface of the food slice is kept substantially free of aqueous liquid or condensate.

The de-oiling method may also be carried out by using a series of manifolds or air knives mounted above and/or below an open mesh transport belt. Oil contents around half that of fried counterparts can be achieved. For example a thin potato slice may have finished oil content after drying of 11% to 18% compared to a fried counterpart of around 36%.

To further improve the amount of oil removed when de-oiling, the manifolds can be fitted with nozzles selected to increase the degree of impingement of the de-oiling fluid on the food slice surface. For example, a manifold fitted with slotted nozzles SL31 supplied by Delevan Spray Technologies or VEEJET H1/4USS from Spraying systems company and mounted almost perpendicular to a linear transport belt at a distance of 10 mm to 50 mm but preferably 10 mm to 25 mm above and below the food slice surface create a physical curtain or knife of gaseous fluid through which the food slice is transported while the oil is held back or blown back. By adjusting the gaseous fluid pressure, nozzle height, nozzle impingement angle or exposure time the oil content in the final chip can be controlled. A manifold pressure of 1.0 to 7.0 bar but preferably 1.5 to 3.0 bar is sufficient to de-oil a food slice to less than 5% in 5 seconds for the orientation described. Food slices can be fully de-oiled in a single pass to less than 3% oil in the finished chip using this method. The de-oiling chamber will benefit from a top and bottom belt to control food slice transport and maintain good presentation of the food slice to the de-oiling curtain by minimizing slice agitation. The de-oiling effectiveness may also benefit from briefly fluidizing the slices to aid distribution, for example by utilizing several manifolds expelling air or another gaseous fluid before the de-oiling curtain. The top and bottom belts should be constructed with maximum open mesh area and one or both may optionally have resistant but compressible properties, provided for example by thin gauge metal wire or rubber polymer constructs, that assist the distribution of slices exposed to turbulent conditions caused by air or other gaseous fluid flows. While pressurized air, superheated steam or other dry gases are suitable stripping media, steam is preferred as the most effective oil-stripping medium. Steam is usable as a dry de-oiling medium under the conditions described above since it decompresses from the manifold pressure to atmospheric pressure but remains substantially non-condensing on the food slice.

Alternative de-oiling media include, but are not limited, to superheated steam or nitrogen. These media offer an advantage over air since they exclude oxygen from contact with the oil or food slice surface, which avoids oxidation and preserves quality. Similarly nitrogen or super heated steam offer an advantage over wet steam since they exclude water from contact with the oil or food slice surface, which avoids hydrolysis of oil and preserves food slice quality. Dry media and wet media may be used on their own or in any combination with each other for example, and illustration only, steam stripping followed by nitrogen stripping. The processor may select the most suitable method taking into account the properties of the food slice being de-oiled.

In one embodiment steam is reclaimed from the primary explosive drying step and compressed for use at the de-oiling step.

In one embodiment, de-oiling is performed in a rotary de-oiler to achieve a fat content of less than half the fried counterpart. The de-oiler may be based on a rotary dryer with a hot air manifold mounted internally or can be a perforated rotating drum, that is optionally mounted inside a hot air circulating oven, and has a directional hot air manifold mounted along its center. As described above, other media for example nitrogen, steam or superheated steam may be used as an alternative to hot air.

In one embodiment, centrifugal de-oiling can be used to lower the oil content in the de-oiling step 142 to the desired level. Some food slices, for example starchy potato slices, will benefit from cooling to improve subsequent handling in the non-oil drying process. Therefore, the surface properties of the slice may be modified to reduce stickiness by cooling and removing condensate from the slice. Slices may be carried on an open conveyor or passed through a cooling tunnel. More rapid cooling can be achieved with a series of manifolds operating with compressed air and optionally equipped with selected nozzles to increase impingement on the slice surface. A dry medium is preferred for cooling but can be selected from air, nitrogen, a combination or other means. Cooling is not a necessary step if food slices do not exhibit sticky surface properties, for example as a result of lower starch availability. In this case it is preferable for energy efficiency to hot transfer the food slices at around 70 C to 90 C into the next processing stage.

The de-oiling step 142 can be used to dial in and control the desired oil content. In one embodiment, the food slices are de-oiled such that the finished, dried food product comprises an oil content of less than 3% by weight. However, less intense de-oiling can deliver higher oil levels in a controlled manner and in one embodiment, the food slices are de-oiled to an oil content of less than 10% and preferably between 5% and 8% or to an oil content of less than 15% and preferably between 11-13% by weight of finished chip. Alternatively, minimal de-oiling is applied to deliver a slice having about 17% to about 25% oil by weight of the finished chip or a simple drain belt with no active de-oiling is used to deliver a slice having 25% to 35% oil by weight of finished chip. Consequently, one advantage of the oil blanching step 114 is the ability to control the oil levels in a food slice through a combination of the oil blanching and the de-oiling conditions.

Directly after oil blanching 114 or after de-oiling 142 the food slices can be optionally pre-dried 154 in a microwave oven, infra-red oven or forced hot air oven at an air temperature of about 120° C. to about 140° C. for about 30 to about 60 seconds to remove some initial water to improve overall process efficiency and improve the ease of handling of the food slice in subsequent unit operations if required. Ease of handling may be improved through reduction in adhesive surface properties and/or an increase in the mechanical strength or elasticity of the food slice both of which can improve singulation of the finished product and avoid unwanted product defects, especially if deep bed and rotary drying methods are used subsequently. The pre-drying step may remove sufficient water to approach the first carbohydrate transition point in the food slice as described later in this application but preferably may be used to remove between one quarter and one half of the initial water, for example reducing the moisture content from around 80% to around 75% wet basis (from approximately 4.1 to 3:1 dry basis) or around 80% to around 65% wet basis (from approximately 4:1 to 2:1 dry basis).

Food slices prepared using either oil blanching or flash frying followed by de-oiling and cooling or optionally de-oiling, pre-drying and cooling may go on to be fully dried or, alternatively, may be packed as a half product suitable for finishing by heating at home or at a secondary location, for example a vending or catering outlet. Food slices intended for this application are preferably de-oiled to less than 15% fat and more preferably to less than 10% fat equivalent of a dried chip. The advantage of this preparation method is to deliver food slices that retain a structural oil content that benefits final chip flavor yet are substantially non-oily and non-adhering on their surface and therefore are suitable for packaging into known formats that may optionally use preservative technologies, for example inert gas flushing, vacuum packing, retort, scavenging or aseptic packing. Those skilled in the art may recognize that pasteurization or sterilization of the half-product may be achieved prior to packing by selection of appropriate time-temperature combinations during the de-oiling step. The de-oiling step ensures the half-product retains some oil for flavor but is not significantly oily on the surface. The half-product cleanly releases from flexible or semi-flexible packaging structures to individual slices for convenient finish cooking via the preferred method (for example pan frying with or without oil, hot air oven, infra-red toasting oven, steam oven or microwave) at the preferred location (for example at home or at a vending, catering or snacks manufacturing site). Thus, one advantage of this preparation method is to enable the end user to experience a low oil, healthy and convenient hot snack product.

Those skilled in the art will recognize that partial drying of the half-product prepared with this method can further improve its suitability for packaging and further increase convenience for the end user. Non-oil par-drying methods, for example baking in a microwave oven, impingement oven or conventional hot air oven are preferred and, using the methods described later in this disclosure the moisture content will preferably be reduced below the starch melting point, typically less than 1 gram of moisture per gram of solids in potato based foods, or more preferably below the starch glass transition point, typically less than 0.25 grams of moisture per gram of solids in potato based food substrates. One advantage over heating a half-product compared to a regular dried snack is that the higher moisture content ensures a more consistent and pleasant finished snack.

In an alternative embodiment to dry or oil based blanching, the potato slices can be wet blanched 110 in water or steam at about 60° C. to about 100° C. for between about 50 seconds and about 3 minutes depending on the heat transfer required by the food slice dimensions. For example, a potato stick (French fry shape) food slice typically requires 3 minutes at about 80° C. to about 90° C. whereas a thin potato slice or slab typically requires about 90 seconds at about 80° C. to about 90° C.

Optionally, after wet blanching 110, the potato slices are then washed 120 in a water wash to further reduce gelatinized surface starch. The washing step may use hot water (typically about 50° C. to about 65° C.) to improve starch solubilisation. In one embodiment, the washing step 120 continuously uses cold water (typically about 15° C. to about 25° C.) that quenches the blanching process and improves the crispness of the final product texture. Either wash may optionally contain marinade ingredients. Removal of excess gelatinized surface starch will lessen the tendency of the potato slices to stick or clump together in later drying steps. A model No. PSSW-MCB speed washer available from Heat and Control, Inc., of Hayward, Calif. USA can be used to remove the surface starch with hot or cold water. In one embodiment, a cold water wash 120 of about 15° C. to about 20° C. containing from about 0.5% up to about 4% salt in solution can be used. One advantage of salt marinade is to facilitate the primary, explosive drying step 200 when a microwave is used. Alternatively, in one embodiment, a hot water wash 120 can help to solubilise excess starch gelatinized by blanching a high-starch food or specific potato varieties noted to release significant amounts of free starch (e.g. Atlantic) to aid in subsequent processing. In an alternative embodiment the gelatinized starch is removed by pressurized water sprays at 1.5 to 3.0 bar mounted at 25 to 50 mm above the transport belt or above and below the transport belt to impinge on the slice surface. Both an upper and lower belt can be used to contain the product during transport through the high-pressure water jets, which act to de-gum the product surface and reduce the ability of slices to adhere to each other.

Optionally, during, prior to, or after any blanching step 110 112 114, the food slices can be marinated meaning that they are exposed to a solution having one or more dissolved compounds to improve the coupling efficiency of the microwave step or modify the final product attributes. Consequently, in one embodiment, the marinade comprises one or more ingredients selected from protective and anti-oxidant ingredients such as sodium sulphite or bisulphate, ascorbic acid (water soluble) or tocopherols (oil soluble); color enhancers such as beta-carotene, and annatto; pH modifiers such as citric or acetic acids; ionic salts such as potassium, sodium or calcium chlorides; enzymes such as glucose oxidase, laccase, lipase, pentosanase, transglutaminase, asparaginase, cellulase or amylase; carbohydrate sugars such as glucose, fructose, maltose, trehalose, and maillard reaction ingredients or long chain carbohydrates such as carageenan, arabic or guar gums, carboxymethyl cellulose, hydroxypropyl cellulose, native or modified starches. Because the objective of the blanching step 110 112 114 is to deactivate enzymes rather than reduce the potato slice glucose content, as in classic potato crisp frying, it can be beneficial for the blanching medium to be fully saturated either by added marinade ingredients or by the starches solubilised from the food slice itself so that no further inherent flavor compounds are solubilised and lost which can lead to a bland flavor in the final crisp.

The blanching, marinade, or washing system can be configured so that slices exit in a way that maximizes separation between slices and minimizes overlap on the next transport section of the process line. A speed wash, available from Heat and Control of Haywood, Calif., USA, is an example of suitable equipment to achieve this in a way that will improve the ease of processing in later unit operations.

The potato slices can then optionally be dewatered 130 to remove surface water and reduce surface tension between slices to prevent clumping in later drying steps by contact with hot or cold air knives for about 2 to about 3 seconds. In one embodiment, the dewatering step reduces the free water (e.g. unbound water outside the potato slice picked up in the washing or blanching stages) from about 20% by weight to about 7 to about 10% by weight.

Surface moisture can be removed using an air sweep-type dryer that employs air knives. In one embodiment, air knives comprise heated or unheated (ambient) jets of air that are directed above the washed potato slice while vacuum suction carries away the dislodged moisture. In one embodiment, low pressure air (e.g. about 1.0 to about 1.4 bar) having a temperature of between about ambient and about 120° C. and a flow speed of between about 12 and about 16 meters per second can be used for sufficient time to remove the free surface water. In one embodiment, a multi-pass air knife, longitudinal air tunnel, or Turbo Air Sweep as manufactured by Heat and Control can be used. In an alternative embodiment the slices are carried on a chain link, perforated or mesh conveyor under and above a series of fine air knives generated by manifolds at 1.5 to 3 bar pressure fitted with slotted nozzles supplied by Delevan Spray Technologies and mounted perpendicularly at 10 to 50 mm above and below the slices. A top and bottom conveyor belt arrangement may be used to control slice agitation and achieve effective surface water removal.

In one embodiment, the surface moisture is substantially removed in a surface drying step 140 to prevent sticking and clumping in later unit operations and delivers the slices evenly distributed across a belt which is sufficiently wide and fast enough to ensure even coverage with minimal overlap. While monolayered slices may be considered the ideal process condition and has been cited as a necessary arrangement step in prior art applications (e.g. U.S. Pat. No. 5,298,707), it is important to appreciate that monolayering is not required for this invention and sliced food will be converted into individual finished crisps at the end of the process. Therefore, partial overlap of at least two slices is acceptable, which significantly simplifies the production process, reduces footprint and improves overall economics. Consequently, in one embodiment, transport, oiling or drying belt coverage comprises a partial overlap of two or more slices and may use a perforated belt constructed from metal links, which may optionally have a non-stick coating or use a polymer belt such as polypropylene, polyester or polytetrafluoroethylene (PTFE), which may optionally be tessellated or perforated to further reduce surface area contact and incidence of product adhesion to the transport belt.

In one embodiment, for those substrates where subsequent handling requires a very dry surface, surface water removal can be further enhanced by routing the potato slices from air knives to an air impingement or air jet impingement oven for between about 30 to about 180 seconds or more preferably from about 60 to about 120 seconds in air having a temperature of between about 60° C. to about 160° C. or more preferably about 120° C. to about 140° C. The time/temperature combination should be selected to dry the slice surface as fast as possible at the highest temperature that avoids excessive gelatinization of any surface starch. Air flows may typically range from about 1 to about 3 m/sec and should be sufficient to contact as much surface area of all sides of the food slice as possible without excessive lifting or displacement from the transport belt, which may cause tearing, damage or loss of control of the food slice. If required, a hold-down belt can be used above the food slices to control agitation. An AIR-FORCE Impingement Oven available from Heat and Control, Inc. of Hayward, Calif., USA can be used. The objective is to remove as much of the surface moisture as possible and to try to achieve a surface moisture as close to about 0% as possible to minimize surface tension effects and optimize handling characteristics in later unit operations. This amount of surface moisture removal however may not be necessary for all food slice substrates or even all potato varieties. As used herein, about 0% surface moisture is defined such that if absorbent paper is applied to the food slice no water is absorbed by the paper. The removal of sufficient surface moisture has occurred when the overall moisture content of the potato slices has reached or is lower than the native water content e.g., the water content after slicing or prior to a blanching step. In one embodiment, the surface drying step 140 reduces the free water from about 7% to about 10% by weight to less than about 2% by weight and preferably to about 0% by weight.

In one embodiment, the potato slices are further dried in a pre-drying step 150 which may utilize a microwave oven, infra-red oven or forced hot air oven may be treated as a continuation of the surface drying step with the aim of improving the overall cost or energy efficiencies of the drying process. A hot air conveyor dryer, commercially available from Aeroglide of Raleigh, N.C., USA, or a hot air rotary dryer (often used in the food industry for rice and seeds) can be used to reduce the moisture content by up to half of the native, raw material starting moisture content. The lowest moisture content exiting the pre-drying step 150 can be set as the point at which all 'unbound' moisture has been removed from the food slice. In one embodiment, potato slices leaving the pre-drying step 150 comprise a moisture content of between about 50% by weight and its native moisture content (typically about 80% for a potato slice) and more preferably between about 65% and about 75% by weight. Drying conditions should preferably be maintained at air temperatures of about 110° C. to about 140° C. for about 60 seconds to about 120 seconds. The pre-drying step 150 can improve the mechanical strength of the slice and help reduce excessive deformation in subsequent explosive dehydration in a rotary drying step and prevent the potato slice from balling up during the explosive dehydration step 200.

The food slices that have not been previously oil blanched or flash fried can then be coated with oil in an oil coating step 160 to a controlled level as required in the final product. Oil is important to the development and finished texture, flavor and mouth feel of the potato crisps. A thin coating of oil, preferably applied in droplet form, can help control the number and size of blisters that are formed when the potato slice is explosively dehydrated 200 in the primary dryer.

The amount of oil imparted by the coating step 160 can be controlled to obtain desired nutritional and organoleptical properties. Any oil or fat is suitable for the process disclosed including vegetable oil, animal fats or synthetic oils, for example coconut oil, corn oil, cottonseed oil, palm oil, palm olein, linseed oil, safflower oil, high oleic safflower oil, palm stearin, soybean oil, sunflower oil, mid or high oleic sunflower oil, rape seed oil, lard, tallow, fish oils, olestra, sucrose polyesters, medium chain fatty acids, diacyl glycerols, or a blend of different oils. The choice of oil can be used to influence the final flavor and mouth feel of the finished crisp as well as the nutrition profile.

In one embodiment, the amount of oil added 160 is such that the oil content of the finished dried potato slice is less than about 10% by weight and more preferably between about 5% and about 8% by weight. In an alternative embodiment, oil is added to achieve an oil content of less than about 25% by finished crisp weight and more preferably about 13% to about 17% so that the finished oil content is less than half that of regular crisps today.

In one embodiment, oil is added 160 to the potato slices by a rotary oiler comprising spray nozzles mounted on an oil lance placed in a rotary drum. The application rate of the oil may be controlled by a simple drum pump and may be measured with a flow meter if desired. For increased accuracy, the flow meter can be calibrated to a mass weighbelt, vibro weighbelt or similar device on the infeed or outfeed of the drum. A rotary drum design similar to those used to season snack foods can be used. In one embodiment, the potato slices are in a rotary oiler, 800 mm in diameter, for between about 10 to about 30 seconds tumbling at about 10 to about 30 rpm. The rpm should be set to maintain sufficient slice separation for coating however, the exact values will depend on the drum dimensions selected for the quantity of slices to be oiled. Preferably, the drum is made from a textured metal or coated with an anti-sticking material such as polytetrafluoroethylene (PTFE) or a fluoropolymer to minimize product sticking to the drum walls. In one embodiment, a perforated or scored pattern can be placed along the drum interior. In one embodiment, the drum interior comprises a longitudinal flight to assist the tumbling action and segregation of the food slices. A longitudinal flight or Archimedes screw can also be used to control dwell time inside the drum. One advantage of a rotary oiler is that the oil can be added to potato slices without the need to monolayer and the unit can physically de-clump any slices that may have grouped together.

In one embodiment, the coating step 160 comprises a monolayer oil spray or alternatively a bakery oiler comprising a spinning plate or a vertical oil curtain can be used for products which are suited to or have been monolayered. In one embodiment, the coating step 160 comprises marinating the potato slices in oil at ambient temperatures or blanching or flash frying in oil at higher temperatures as described above. In one embodiment, the pre-drying step 150 and oil coating step 160 occurs in the same rotary device. In one embodiment, oil addition 160 occurs during the explosive dehydration step 200.

The addition of oil 160 to the food slice produces several advantages. For example, oil can be used to control the formation of blisters so that many small blisters form where otherwise large bubble blisters may occur. This is particularly true at lower drying rates (longer drying times) when steam is generated less rapidly. At higher drying rates, the explosive dehydration has a similar result by a different mechanism since a porous structure is created by escaping steam to relieve internal pressure. Further, oil is heated in the microwave particularly when moisture contents are low as in phase 3 of the drying curve described later. The heating initiates a chemical-food reaction in the oil which develops fried flavor notes. A similar effect can be achieved if the oil is "conditioned" by heating off line, either using conventional heating methods, microwave energy or otherwise and then applied via a spray onto the product. In fact, the oil can be "conditioned" by using the oil first in other applications, such as a heating medium for another food line. Instead of disposing the oil at the end of its useful application as a heating medium, it can be reused as an oil additive in Applicants' invention. When Applicants refer to "conditioned" oil, this includes oil that has been worked previously by any means, including, hut not limited to, heat, oxidation, and hydrolysis. If oil is applied to the product prior to microwaving, the oil confers the additional advantage of acting as an energy or heat sink towards the end of the drying cycle when the moisture content is low. This is evidenced by experiments conducted by the inventors that reveal higher exit temperatures for a given time or moisture content of products which have been oiled prior to microwave drying verses non-oiled products. Consequently, adding oil prior to the explosive dehydration step 200 reduces the incidence of scorching in the microwave and drying can therefore continue to lower final moisture contents without generating undesirable burnt notes in the potato crisp or snack.

The potato slices are then routed to a microwave for the explosive dehydration 200 step. To improve process control and enable more accurate drying at high rates, food slices may be routed via a mass feed weighbelt. A similar advantage is obtained for food slices originating from doughs by forming and depositing in pieces of controlled volume or mass. As used herein the terms, "explosive drying," "explosive dehydration," "rapidly dehydrated" and "primary drying" are synonymous and are defined as simulating a dehydration profile corresponding to a fried food product that occurs in a non-oil medium. The non-oil heating medium can include but is not limited to, microwave radiation, infrared radiation, radio frequency radiation, superheated steam, air and combinations thereof. The primary energy source applied for evaporation of water by non-oil heating may be supplemented with additional heat sources or energy sources such as hot air, steam, superheated steam, microwave, infrared or radio frequency radiation. Commercial production of potato crisps typically involves a continuous process wherein sliced potatoes are continuously introduced into a vat of frying oil at a temperature of about 365° F. (about 185° C.), conveyed through the oil by paddles or other means, and removed from the oil after about two and one-half to three minutes of flying by an endless conveyor belt when the moisture content of the crisps has been reduced to about 2% or less by weight of fried chip (equivalent to around 3.0% or less of finished chip potato weight). The resulting product generally has texture and flavor characteristics, which are usually recognizable by consumers as typical commercially produced continuous process potato crisps.

Figure 4:
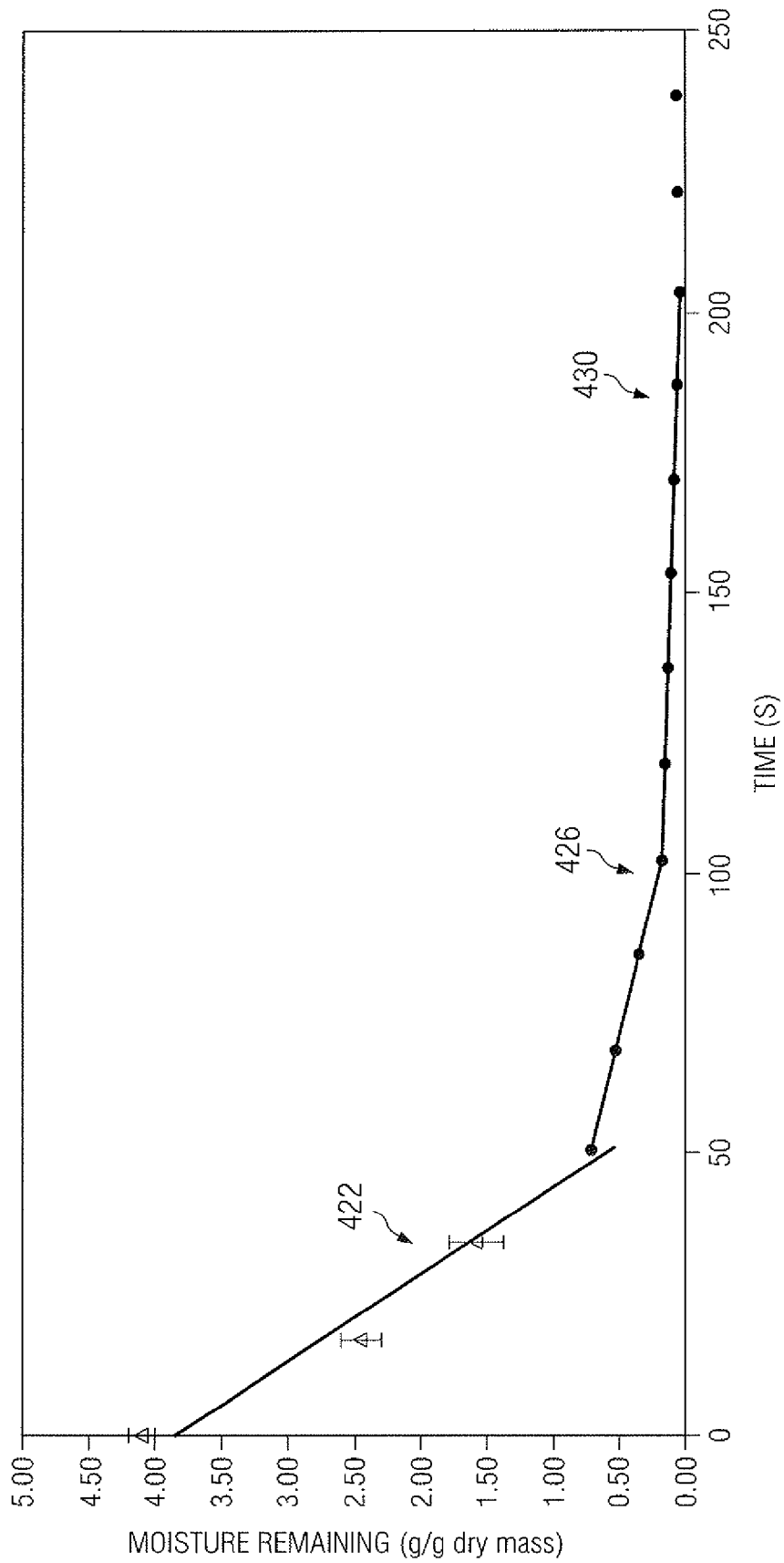
FIG. 4 is a graphical representation of the dehydration profile of a plurality of potato slices in accordance with one embodiment of the present invention.
Figure 6:
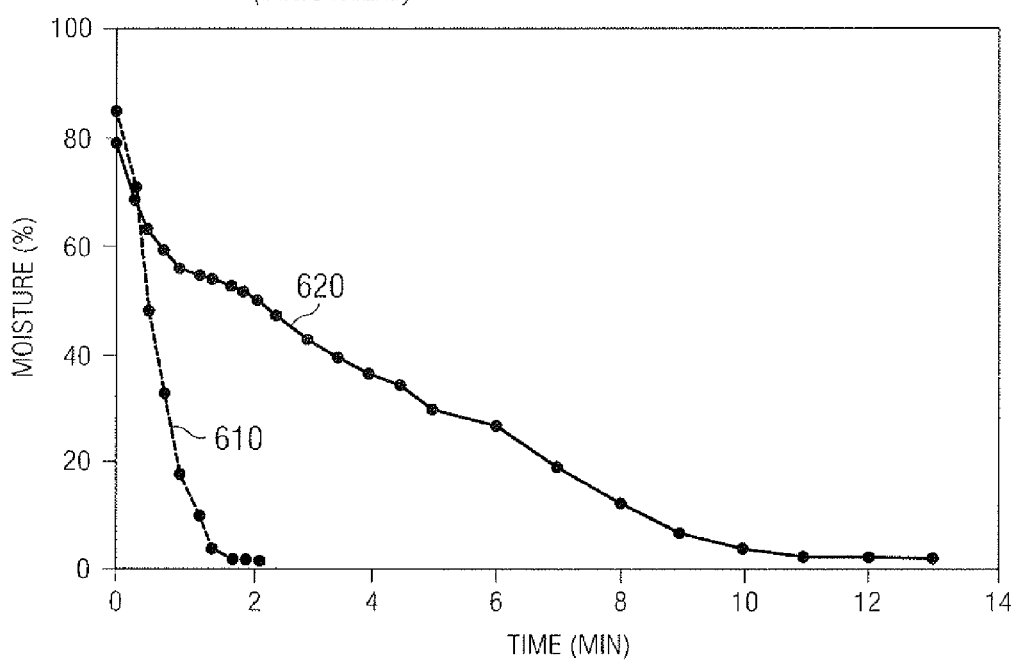
FIG. 6 depicts a prior art dehydration profiles of continuously fried potato slices and batch kettle fried potato slices.

FIG. 6 depicts a prior art dehydration profile of continuously fried potato crisps 610, and is taken from FIG. 4 of U.S. Pat. No. 5,643,626, assigned to the same assignee as the present invention. As shown, a potato slice having a moisture content of greater than about 80% is dehydrated to a moisture content of about 20% about one minute and to a moisture content of less than about 3% in about 2 minutes. Also shown by FIG. 6 is the dehydration profile of a batch kettle fried hard bite potato crisp having a slower dehydration profile 620 but still cooked in hot oil. Either of these dehydration profiles 610, 620 can be simulated in a non-oil medium in accordance with embodiments of the present invention. By simulating these drying profiles, the present invention can also simulate the different finished crisp textures associated with these two dehydration profiles 610, 620 or any profile in the spectrum of either atmospheric or vacuum frying. Not to be limited by theory, the inventors believe that by simulating the dehydration profile, the invention also effectively simulates the starch conversion that occurs and is largely responsible for the finished crisp texture. In this context 'starch conversion' refers to the temperature and moisture content of the majority of carbohydrates in the food slice as the majority of carbohydrates pass through each transition and the time the majority of carbohydrates spend in each transition phase (molten/liquid, rubbery/elastic or glass/crystalline). Carbohydrate melting and transition points have been determined and published elsewhere using simple capillary studies or techniques like Diffraction Scanning Calorimetry (DSC) to measure enthalpy changes.

The present invention can be used to mimic the dehydration profile of any fried food. Consequently, in one embodiment, the present invention provides a method for microwave cooking a food product to mimic the organoleptic characteristics of a fry-cooked product. An example of how the present invention can be utilized to provide a non-fried potato crisp having a dehydration profile that mimics the dehydration profile of a continuously fried potato crisp is provided below.

First, a dehydration profile corresponding to a fried food product is identified. For example, as previously indicated, FIG. 6 depicts the dehydration profile of continuously fried potato crisps 610 and the dehydration profile of batch kettle fried hard bite potato crisps 620. In one embodiment, the dehydration profile of a fried food can be determined by using a continuous flume fryer and removing samples at various distances related to certain times or a batch catering fryer where samples are 'fished' out of the oil at certain times and moisture content then determined. Next the food product is prepared for microwave cooking. For example, a potato can be prepared by blanching and optional pre-drying. The potato slices can then be cooked at a controlled power corresponding to the power required to reproduce, mimic, or create a substantially similar desired dehydration profile 610, 620 as depicted in FIG. 6. This can be accomplished through trial and error by, for example, experimenting with a belted microwave under constant power settings, one can remove the microwaved food products at certain times and positions to determine the related moisture contents. The power level can be adjusted as required for the specific microwave system and food slice combination in use. Consequently, in accordance with one embodiment of the present invention, the controlled power corresponding to the power required to reproduce a dehydration profile of a fried food product comprises a first microwave power and a second microwave power. In one embodiment, the controlled power corresponds to transition points in the dehydration rate of the food slice which are believed to relate to starch transitions. The above example is provided for purposes of illustration and not limitation. The same method described above can be used to mimic the dehydration profile of other fried food products including, but not limited to tortilla crisps, corn crisps, French fries and hash browns. Since these products will have different initial moisture contents and may optionally have been pre-dried (e.g. in a toasting oven) the microwave drying profile should be adapted to suit, as described above.

In one embodiment, the explosive dehydration step 200 comprises simulating a dehydration profile to a moisture content of between about 2% and about 15% and preferably between about 4% and about 8% by weight in an amount of time that is similar to the time required for the comparison fried food product. The dehydration rates and starch conversion rates in the first two phases of the dehydration profile should be similar to and preferably match those of the comparison fried food product to achieve similar texture. For example, in one potato-based embodiment, the present invention comprises dehydrating the moisture content in a plurality of potato slices from greater than about 60% moisture by weight to less than about 20% moisture by weight in a non-oil medium in less than about 60 seconds. In one embodiment, the explosive dehydration step 200 further comprises reducing the moisture content in the slices from a first moisture content of between about 65% to about 80% by weight to less than about 15% by weight in a non-oil medium in less than about 120 seconds. In one embodiment, the explosive dehydration step further comprises reducing the moisture content to less than about 10% by weight or preferably less than about 2% by weight in the explosive dehydration step in less than about 180 seconds.

Figure 2:
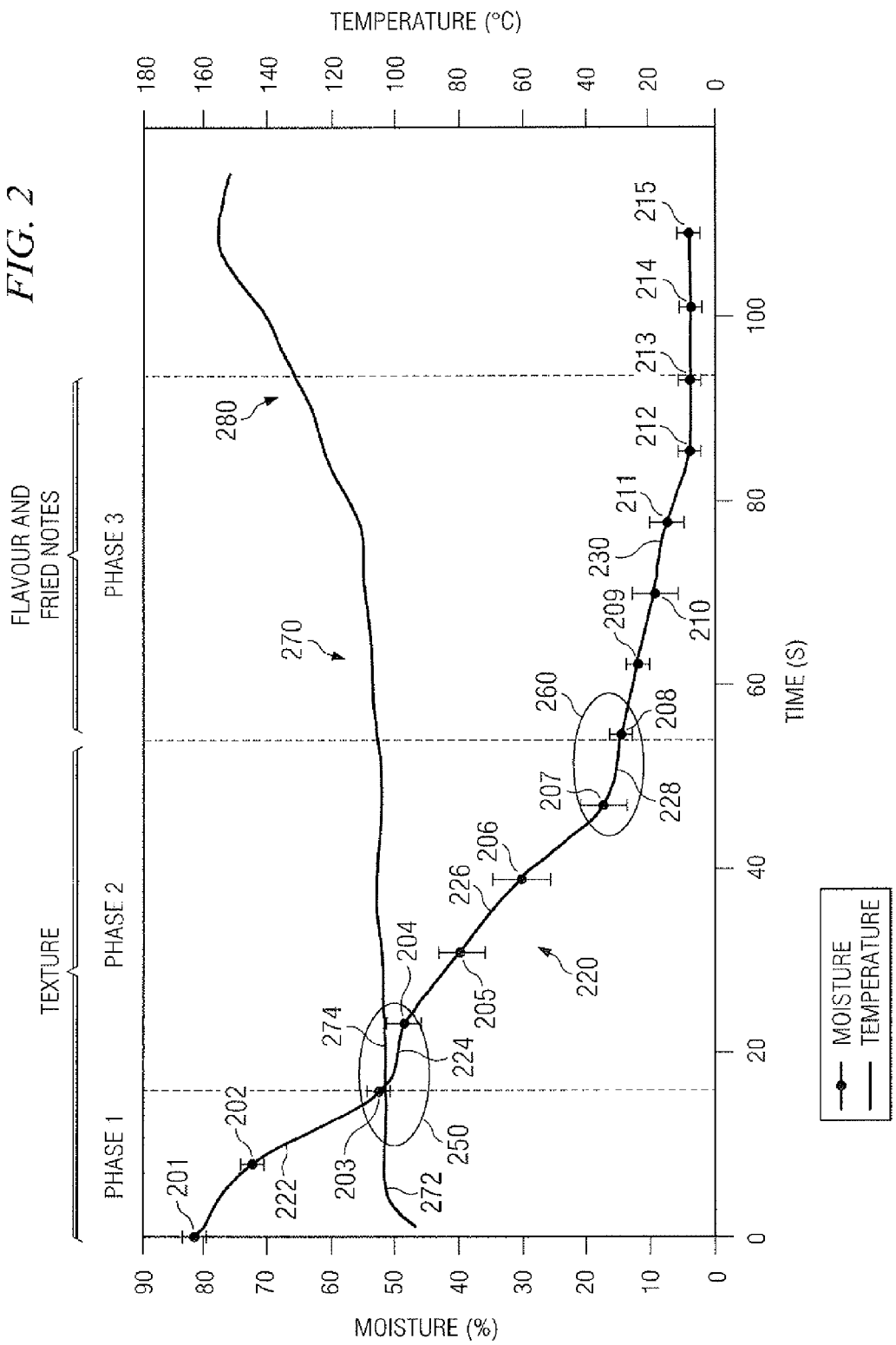
FIG. 2 is a graphical representation of the dehydration and temperature profile of a plurality of potato slices undergoing an explosive dehydration step in accordance with one embodiment of the present invention.

FIG. 2 is a graphical representation of the moisture content as depicted by the moisture dehydration curve 220 and temperature profile 270 of a potato slice undergoing an explosive dehydration step in a microwave in accordance with one embodiment of the present invention. As shown, prior to explosive dehydration, the potato slice comprises its native, raw state moisture content of just over about 80% moisture by total weight 201. Of course, in accordance with other embodiments of the present invention a blanched and/or par-dried potato slice can comprise a lower moisture content, as described above. Different potato varieties or other food materials (for example carrots) will have different raw moisture contents that may be different than described here. At this point, 201, the potato slice is wet, slippery, rubbery, and flexible. As the potato slice becomes more dehydrated, it becomes drier, less slippery, but remains rubbery and flexible 202. Onsets of blistering begin to appear throughout the slice, but the biggest concentration of the blistering occurs mainly at the edges as small, flat, irregular shapes. The onset of the blister formations can peel off implying potential steam explosions from within the slice. No puffing is observed at this point 202. In this approximate same time frame, the potato slice temperature reaches the boiling point temperature 272 and there is a relatively high rate of water vaporization 222. At the point depicted by numeral 203, the potato slice is drier than in 202 and there is an appearance of larger onsets of blistering throughout the slice. The potato slice is still flexible and some areas feel rubbery. The potato slice is not slippery at this point 203. The temperature of the potato slice remains flat 274 for a while after the potato slice approximately reaches the boiling point temperature of water at atmospheric pressure. There is also a slowing of the dehydration rate depicted by the slight flattening 224 of the moisture dehydration curve 220. Without being limited to theory, the inventors believe that the apparent flattening 224 of the dehydration curve coincides with the starch melting point 250 as determined in scientific literature using DSC methods, where many of the starch solids begin to melt. In the potato slice embodiment, the starch melting point 250 occurs when the slice has been dehydrated to about 50% moisture by weight and when the slice temperature is at about 100° C. For ease of interpretation, the period before this transition point has been classed as phase 1.

At point 204, the drier potato slice continues to have the appearance of more blisters throughout the slice periphery. The slice at this point 204 is still rubbery and flexible. At point 205, the potato slice is in the second drying phase (or phase 2) which occurs between the two transition points 250, 260 identified and where the starch is thought to be primarily rubber 226. The slice at point 205 is drier than the slice at 204 and there is the onset of a rough surface appearance and some degree of floppiness indicating the entire slice is not yet fully set. At point 206 the slice is hardened and appears set. Some brittleness has developed with a certain degree of give. The surface appearance is rough throughout.

At point 207, there is a flattening of the curve depicted by numeral 228. Again, without being limited to theory, the inventors believe such flattening 228 occurs as the starch enters the glass transition stage 260 and the starch solids begin to enter into a glassy state, labeled as phase 3. At point 208 the potato slice is drier and more brittle than at numeral 207 and the surface resembles a flat disk. At point 209, the potato slice is drier and more brittle. At point 210 the slice is drier and more brittle than at 209, and some puffed blisters are observed. At numerals 212, 213, 214, and 215 the potato slice is similar in appearance as in numeral 211. As the potato slice moisture content is low and the remaining moisture is less available for microwave energy to couple with in the final glassy state 230, the temperature of the food slice rises 280, which beneficially increases intensity of cooked potato flavor or imparts fried flavor notes into the food slice in the phase 3 drying stage if the slices are pre-oiled. For pre-oiled slices during phase 3 of the drying cycle, at low moisture contents, the microwave energy is thought to preferentially couple with the oil. This has been observed to generate beneficial fried flavor notes. Further, oil acts as a heat sink that helps prevent scorching and provides a broader opportunity for moisture control at the end of the drying process. Consequently, pre-oiled slices make the process more controllable and products develop flavor more characteristic of flied chips. Steam can also be used at the end of the drying cycle to help control drying to an equal rate between slices and avoid product scorching.

Figure 3:
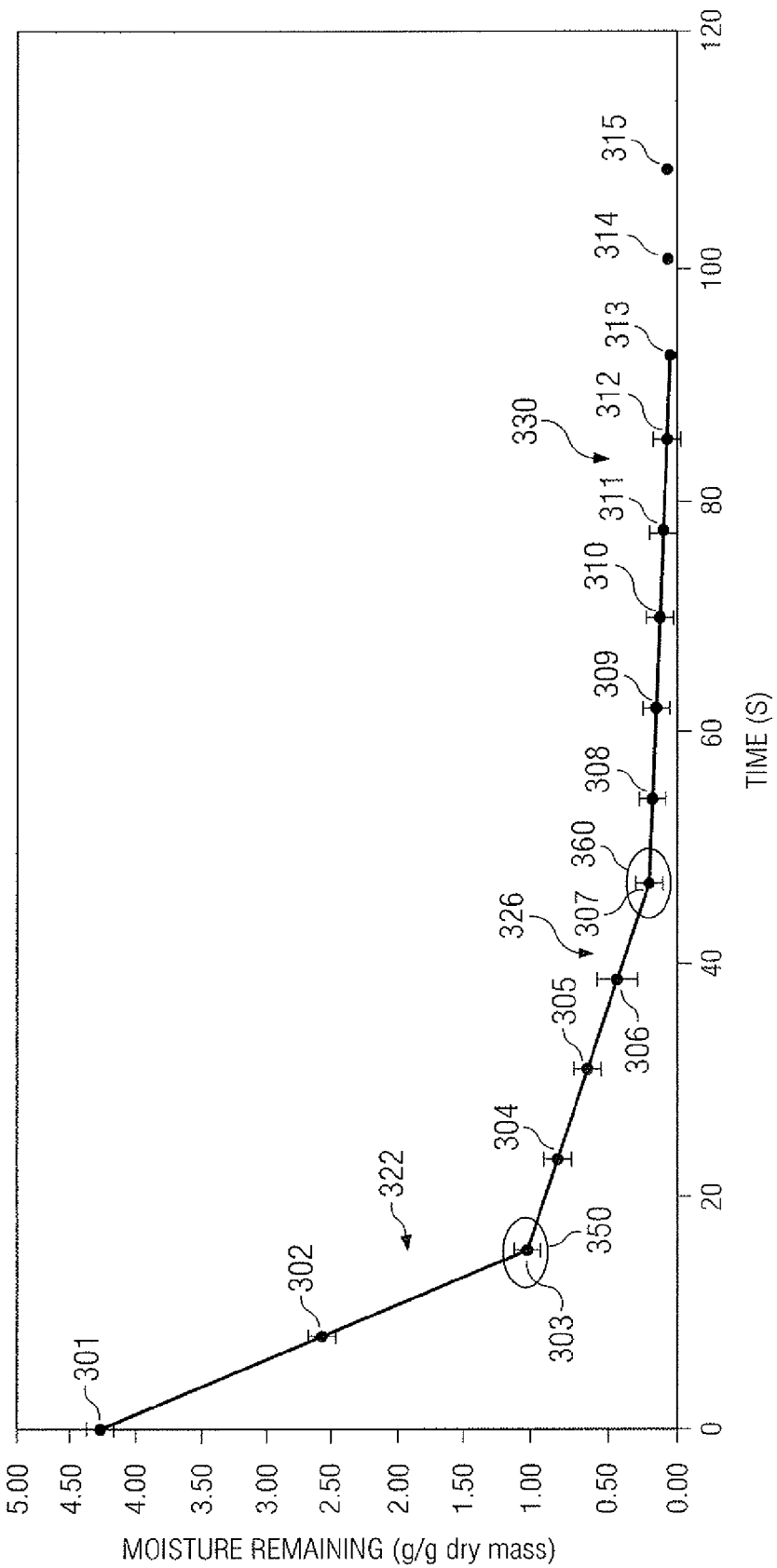
FIG. 3 is an alternative graphical representation of the dehydration profile depicted in FIG. 2.

FIG. 3 is an alternative graphical representation of the moisture content of the same potato slices depicted in FIG. 2. Instead of the moisture content being measured on a total weight basis, e.g. the water weight divided by the sum of the water weight and the dry solids, the moisture content is depicted as a ratio of the moisture remaining in the potato slice to the dry solids in the potato slice. The actual drying rates defined by grams of water removed per second as a ratio of the solids as depicted in FIG. 3 is a direct, primary and therefore more useful measure of the process conditions required to achieve target textures as opposed to a measure corresponding to the microwave power absorbed because the power absorbed by the product is specific to the cavity and product combination. The depiction as in FIG. 3 has been found to be a useful assessment tool to determine and better delineate the three different drying phases that appear to be marked by the starch transition points. Indeed, experiments have demonstrated that the drying rates and transition points can be defined accurately and are highly reproducible especially when a homogenized food sample and/or controlled piece weight is used for determinations. Since these drying rates have been associated with different product textures, it is possible to precisely define the carbohydrate transition points and the relationship between dehydration profile and finished product attributes. It should be pointed out that the numerals 201-215 in FIG. 2 depict the same data, in different units, as the corresponding numerals 301-315 in FIG. 3.

As shown in FIG. 3, the drying curve has been divided into three distinct drying rates or phases. The first phase or first dehydration rate 322 starts when the food slice temperature reaches the boiling point and the moisture level begins to decrease. The slope of the line 322 depicts the first phase dehydration rate, which is 0.2 grams moisture per gram solid per second in the embodiment shown. Once the potato slice reaches its starch melting point range 350, the dehydration rate slows. Consequently, the second dehydration rate phase 326 shown in FIG. 3 is 0.03 grams of moisture per grain of solid per second. The second phase dehydration rate is constant until the potato slice starch reaches the glass transition stage 360 and passes into phase 3. In the phase 3 dehydration stage 330, the temperature of the food slice increases to impart desired flavor notes. The exact temperature increase and profile will depend on the level of pre-applied oil as well as other drying energy factors.

A rise in the product temperature represents a change in absorption of the microwave energy away from water during the latter drying stage. Product drying can be stopped just prior to temperatures rising rapidly toward the end of the drying cycle when microwave energy heats organic matter of the substrate directly rather than water. The exact temperature profile will be in part dependent on product formulation and can be determined by trial and error and then set as a process control parameter. Consequently, in one embodiment, the potato slice is removed from the heating stage 330 when the potato slice reaches a certain temperature. By removing the product before a significant temperature rise occurs, the development of acrylamide can be minimized. In one embodiment, the food slices are removed from the microwave at some time after the slices reach a temperature of about 110° C. and preferably before reaching about 140° C. and optimally before reaching about 120° C. to minimize acrylamide formation. In one embodiment, the heating stage 330 occurs under vacuum to further minimize acrylamide formation. In one embodiment, the explosive dehydration step 200 occurs in a vacuum microwave. Such an embodiment advantageously reduces the temperature of the food slices during dehydration resulting in lowered levels of acrylamide. Those skilled in the art will recognize that by operating under vacuum, the temperature and moisture parameters of the starch conversion are modified and this can be used to further manipulate finished product texture. Therefore, in one embodiment, all or a portion of the microwave dehydration occurs under a vacuum where the vacuum level is selected according the finished product texture desired. In one embodiment, the microwave comprises a micro vacuum of between about 20 to about 80 torr where the boiling point of water is less than about 46° C. or a high vacuum of between about 150 to about 250 torr where moisture boiling point is between about 60° C. and about 70° C. In one embodiment, the vacuum may be released or partially released towards the end of the drying cycle to encourage flavor development in the crisp. Alternatively, a low vacuum of about 500 to about 700 torr where moisture boiling point is between about 90° C. and about 98° C. may be applied to slightly lower product temperatures while minimizing the risk of ionizing a rarefied atmosphere containing microwave energy. In one embodiment the vacuum level is increased towards the end of the drying cycle to avoid exposing heat sensitive food materials to excessive temperature when moisture contents are low and therefore to minimize acrylamide formation. Of course the requisite vacuum level can depend on one or more factors including the food substrate material, desired degree of puffing, microwave power, food substrate shape, etc. Consequently, the vacuum can range from 0 to about 760 torr.

It should be noted that the specific dehydration rates depicted for three dehydration phases shown in FIG. 3 merely depict one embodiment of the present invention. The actual drying slopes can be controlled to simulate frying based upon the power provided by a microwave, the design of the applicator and the composition of the food slice.

Table 1 below depicts the dehydration rates for the three phases for a single cavity (applicator), continuous belt, multimode microwave run at two different power levels. Such information is provided for purposes of illustration and not limitation. The claims scope of the present invention applies to any microwave system where energy is absorbed by a food slice in the microwave field and is not limited by design specifics such as number, location, design or orientation of waveguide inputs; microwave frequency; number of modes; shape of cavity (applicator) etc.

The microwave heating chamber used to generate the information depicted in Table I contained on average 39 potato slices (Saturna), dry mass equivalent of about 35 grams, at any instant. At Pf=6 ("Medium" power in this example), to achieve drying rates of about 0.2, 0.03 and 0.004 grams moisture per gram dry mass per second over the drying times shown in FIG. 3 required absorbed microwave powers of about 2.6, about 0.8, and about 0.2 kW respectively (3.5 kW in total). Therefore, the absorbed power distribution for Phase 1, Phase 2 and Phase 3, is about 73%, about 23% and about 4% of the total absorbed power respectively. Similarly at Pf=3 ("Low" power in this example) the drying rates of about 0.065, about 0.01 and about 0.001 shown in FIG. 4 (discussed below) required absorbed microwave powers of about 1.3, about 0.2, and about 0.04 kW (about 84%, about 13% and about 4%) respectively (1.5 kW in total). These numbers provide a guide, to one skilled in the art, to the power distribution required in the microwave drying process (explosive drying) in this worked example. However, these values are specific to the pilot process (microwave cavity and power source) in use and should be set to ensure the absorbed power delivers the desired drying rate quoted in grams moisture per gram dry mass per sec for which ever cavity is in use.

Since the actual energy absorbed is a function of cavity design and product, the efficiency of a specific microwave system must be known to set the relevant forward power. In this case, assuming a coupling efficiency of about 70%, the Pf=6 "Medium" power setting corresponds to power available in the cavity of 5 kW, and the Pf=3 "Low" power setting corresponds to power available in the cavity of 2 kW (the excess energy being absorbed by the cavity walls and internal support structures). In both cases, reflected power was around 1 kW, corresponding to the actual forward power setting used in the experiments of 6 kW and 3 kW for the Pf=6 and Pf=3 power runs respectively.

TABLE 1

Drying rates (grams moisture to grams dry mass per second)
Potato Slice Dehydration Rate Examples
to Match Continuous Frying of Regular PC

|  | Pf = 6 (FIG. 3) | Pf = 3 (FIG. 4) |
| --- | --- | --- |
| Phase 1 | 0.2 | 0.065 |
| Phase 2 | 0.03 | 0.01 |
| Phase 3 | 0.004 | 0.001 |

While not being limited by theory, the inventors recognize that phase 1 and phase 2 appear to be responsible for mimicking the texture generated by frying using the disclosed non-oil drying method. Phase 1 corresponds to the evaporation of a large amount of water. In phase 1, drying rates are highest and the inventors have observed these drying rates are often similar between "different" food slices (e.g. raw slices and dough slices of similar starting moistures) for a given set of microwave conditions. This is most likely due to the 'free' nature of the moisture being removed in this phase. Phase 2 relates to a significant starch transition during which time the native starch is thought to be in a molten state since this is known to occur at about 50% moisture (1 g water per g of starch solids dry basis) at 100° C. Starch melting is traditionally slow in kettle fryers and quick in continuous fryers so that the resultant texture varies from crunchy to crisp. Without being limited by theory, it is possible that in phase 2, the drying rate may be dependant on the nature of the food slice as well as the drying energy applied since diffusion-limiting factors may be expected to be more influential on water transport than in phase 1. In phase 3, the starch, and therefore texture has set, so phase 3 primarily influences the finished crisp flavor and color and also facilitates equilibration of the moisture distribution within and between food slices.

With the knowledge that drying profiles can be divided into three distinct phases and an understanding that these phases influence the finished product in different ways, a drying profile can be determined that manipulates the product texture and flavor in a similar way to changing the profile of a fryer today from continuous to kettle. For example, to achieve a kettle like texture, energy input is reduced in phase 2 to simulate the slower starch melting that occurs in kettle crisp fryers. Effectively, a microwave can be tuned to deliver the same effects as a fryer—using energy transfer to replicate conductive heat transfer without the use of oil.

In one embodiment, the continuous microwave cavity is divided into multiple continuous cavities through a series of chokes or baffles. By selecting appropriate positions for each choke device, the microwave energy input can be independently controlled at each point along the drying curve. This enables the user to specify and control to different drying rates during each phase, or if desired within a phase. Therefore, the drying rate of phase 2 could be reduced as above for 'kettle' texture or could, for example, be increased to match that of phase 1 in order to reduce the overall drying time while the drying rate in phase 3 may, for example, be decreased in order to confer a broader control window over the moisture and temperature exit conditions.

An alternative embodiment uses batch microwave drying in place of continuous microwave drying. Those skilled in the art will be familiar with domestic microwaves that operate on a batch basis with either a continuous or pulsed power input. By way of reference, a typical domestic oven has been measured to have a phase 1 drying rate 10 times slower than the example given for Pf=6 in table I above and a total drying time, approximately 4 times as long. As outlined above, this method will deliver a harder product texture and will create more challenging control conditions to remove the product at an equilibrated, consistent moisture content at the end of the drying cycle since the power input remains constant even when moisture is low towards the end of the drying cycle.

Therefore, in one embodiment, a batch microwave is used with the power input adjusted over the time of the drying cycle to simulate the energy profile of a continuous drying system. By way of example but not limitation, for the Pf=6 example given in table 1 above, the power input (which is determined by product load and cavity design) would be reduced at a time that coincides with the start of each phase so that phase 1 received about 73%, phase 2 received about 23% and phase 3 received about 4% of total energy required for drying. The power profile can be tailored to deliver the desired product and most economic drying conditions for the food slice taking into account that hot air addition and vapor extraction may also be used to assist the drying process. In one embodiment, the principle of controlling power input over time for batch drying is applied when operating the microwave chamber under vacuum as described above.

FIG. 4 is another graphical representation of the dehydration rate of a plurality of potato slices in accordance with one embodiment of the present invention. The microwave power energy input per kg that produced the data for FIG. 4 was lower than the power used to produce the data in FIG. 3. As shown in FIG. 4, there are three distinct drying phases that have a high linear correlation. The first phase dehydration rate 422 is about 0.065 grams moisture per gram solid per second. The second phase dehydration rate 426 is about 0.01 grams moisture per gram solid per second and the third phase 430 comprises a dehydration rate of about 0.001 grams water per gram solid per second.

Figure 5:
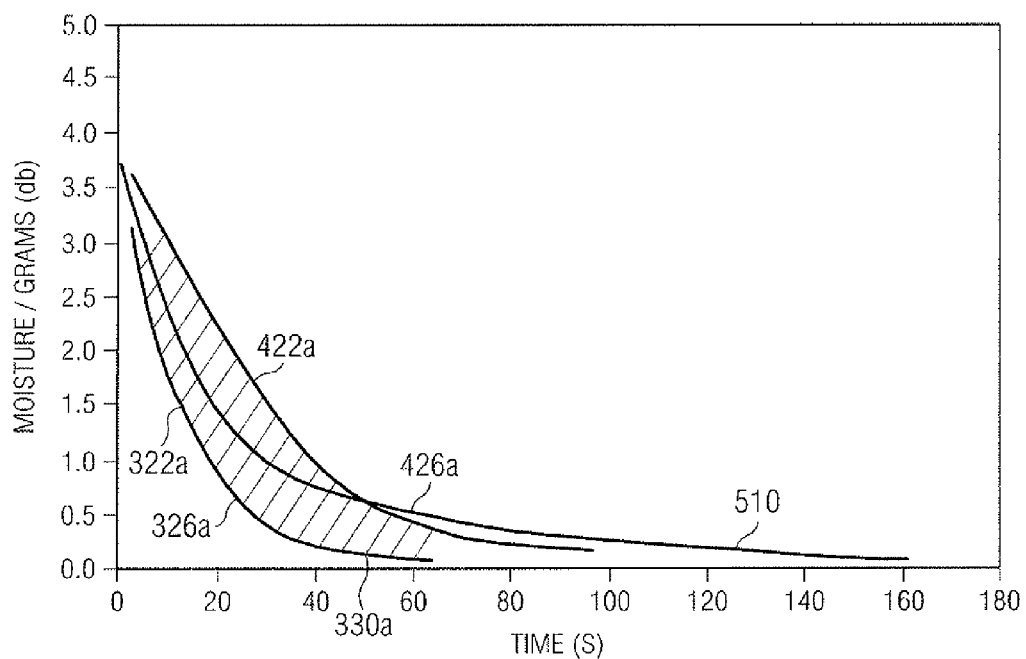
FIG. 5 is an approximate comparative graphical representation of the data depicted in FIG. 3 and FIG. 4.

FIG. 5 is an approximate, comparative graphical representation of the data depicted in FIG. 3 and FIG. 4. The lower line 322a, 326a, and 330a and upper line 422a, 426a define the drying rate window in which the target texture was reproduced for the potato crisp product being studied. Because the lines depicting the dehydration rates in FIG. 3 and FIG. 4 have been curve fit, the upper and lower lines are approximate. As a result, the numerals have the letter "a" associated to indicate the slight variation.

As shown, the first dehydration rate 322a, second dehydration rate 326a and third dehydration rate 330a from a microwave oven operating at a power rate required to achieve the depicted dehydration rates 322a, 326a form a lower boundary. Similarly, the first dehydration rate 422a, and second dehydration rate 426a from a microwave oven operating at a power rate to achieve the depicted dehydration rates 422a, 426a determine an upper boundary. It is the shaded area between these two boundaries that corresponds to a region that mimics the dehydration profile 510 of a continuous deep-fried thinly sliced, flat cut potato crisp. Consequently, in accordance with one embodiment of the present invention, a food slice dehydration profile that delivers texture and organoleptic properties similar to its fried counterpart but occurring in a non-oil medium, lies in the shaded region. In summary, the study of microwave drying of food slices has revealed three different drying phases that appear to be marked by the starch transition point, the melting point and the glass point. In phase 1 the drying rates are highest prior to the starch melting and 'unbound' water is substantially removed. The faster this moisture is removed the more porous the slice surface is expected to be and the fewer the final number of blisters. In phase 2 the drying rates are intermediate post-starch melting and the rate at which the food slice transitions through this phase influences how the texture is set in the final snack. In phase 3 the drying rates are lowest post starch glass transition. In phase 3, the flavor and color is developed and moisture is equilibrated. Cooked potato and fried flavor notes are imparted, particularly when oil is present on the food slice and the oil and food slice are heated through microwave power coupling preferentially with the oil at lower moisture contents and some added steam heating present during this final moisture evaporation stage. This results in a relatively higher exit temperature but more controllable product and process conditions at the end of the microwave drying step.

The phase 1 and phase 2 drying rates appear to be proportionally related when presented for continuous drying in a uniform microwave field. Further, phase 1 appears to be product independent while phase two appears to be product dependant. In other words, whether the product or food slice is a dough-based slice or a sliced raw food, such as a potato, phase 1, or the first drying slope, will yield somewhat similar results for sliced and dough-based foods subject to the same evaporative energy. Phase 2, or the second drying slope, is more product dependent and the dehydration rate will vary between sliced food and dough-based foods. By way of example, for a raw potato slice, the phase 1 to phase 2 slope dehydration ratio is about 6.5:1. For a potato dough slice, the phase 1 to phase 2 dehydration slope ratio is about 3:1 in a single continuous cavity.

One important benefit of the present invention is that the rate of microwave drying can influence the product texture. Consequently, with knowledge of the carbohydrate transition points, which is easily determined using a belt-driven microwave cavity, a dehydration profile can be determined that manipulates the product texture as desired. Acceptable snack products can be made from food slices comprising fresh raw materials in primary or explosive drying times from about 30 seconds to over 12 minutes. Longer drying times (specifically a longer time in phase 1 and 2) create slightly harder and glassier textures similar to batch kettle fried hard bite potato crisps. For example, to achieve a kettle-like texture, energy input can be reduced in phase 2 to simulate the slower starch melting phase that occurs in the kettle crisp fryers today. Faster drying times (specifically a shorter time in phase 1 and 2) create more light and crisp textures similar to the fried snack foods made in continuous fryers of today. Effectively, a microwave can be tuned to deliver the same effects as a fryer and can thereby replicate heat transfer without the use of oil.

A further series of experiments were performed to quantify the preferred drying rates for each of the three phases when using a freshly prepared potato based food slices to make snackable foods. Potato slices in a raw slice form and were prepared using one of the blanching methods disclosed to give a native moisture content around 75% to 82% and a wet piece thickness of 1.4 mm. The summary of preferred rates is given in table 2 below. Table 2: Drying rates by phase for potato based food slices: rates given are gram of moisture removed per second per gram of dry matter (dry basis);

|  | more hard crunchy texture ←——————→ |  | more light, crisp texture |
|---|---|---|---|
|  | Minimum Rate | Preferred Range for texture | Maximum Rate |
| Phase 1 | 0.02 | 0.06-0.18 | 0.20 |
| Phase 2 | 0.004 | 0.01-0.06 | 0.08 |
|  | more pale, bland flavor ←——————→ |  | more cooked, bitter flavor |
|  | Minimum Rate | Preferred Range for flavor | Maximum Rate |
| Phase 3 | 0.0005 | 0.002-0.02 | 0.03 |

In one embodiment, potato slices ranging from 1.0 mm up to 3.0 mm thick, but preferably 1.3 to 2.0 mm are processed using one of the combinations of drying rates disclosed above. In one embodiment potato based food slices in composite pellet form ranging from 1.0 mm up to 3.0 mm thick, but preferably 1.3 to 2.5 mm are processed using one of the combinations of drying rates disclosed above. As already described, each phase can be varied independently, in a continuous or batch process, between the maximum and minimum limits in table 2 to generate the desired flavor, texture and appearance product attributes in the finished food or to optimize the processing or engineering solution for the manufacturing equipment used. Therefore, in one embodiment, any combination of the above drying rates for each phase may be used to process a food slice.

A method has been devised using a microwave oven to simulate the non-oil cooking medium and accurately determine the drying rates for each phase in order to simulate a fried food product. This method is novel in its use of a microwave cavity to generate data that enables starch and carbohydrate transitions to be identified and for that information to be directly relevant and applicable to design a process that tailors the product attributes of a snack food to simulate its fried counterpart. While starch transitions are known to occur in normal frying processes, historically experimental noise associated with the methods for determining drying profiles have masked the ability to determine starch transitions with any accuracy. One advantage of Applicants' method is that it does not rely on specialized or complicated analytical equipment (e.g. Diffraction Scanning Calorimetry) to determine the carbohydrate transition points but uses pilot or production scale processes typical of those found in applied manufacturing development facilities. A further advantage is that the method is capable of sufficient precision and accuracy to optimize product attributes and define the relevant process conditions and to use this information to design a large-scale production line that accurately reproduces a laboratory or pilot product at commercial scale. Since drying rates will be influenced by the degree of uniformity of the food product, its size, shape, recipe and composition, it is preferable to generate initial drying curves on a homogeneous base of the simplest geometry comprised of the primary carbohydrate with, optionally, a controlled amount of oil. Subsequent optimization of the process conditions can be carried out according to the final compositional and dimensional attributes of the product to be processed.

A single chamber, continuous conveyor microwave oven equipped with a side-opening panel that allows full belt access between inlet and outlet chokes is the preferred pilot experimental equipment. A unit was designed and constructed by C-TECH, Capenhurst, UK for this purpose. The equipment should be temperature equilibrated at a pre-determined, fixed power before use. Food slices are prepared and presented to the microwave oven in a uniform configuration of rows and columns. For improved accuracy food slices should be selected to be of similar size, shape, weight, moisture content and moisture distribution. For maximum piece-to-piece uniformity the food slices may be homogenized (for example, by ricing, grinding or milling) and then reformed into consistent pellets, optionally incorporating a mixture of ingredients to make a composite product if desired. Operating at fixed power the residence time of the food slices inside the heating cavity of the microwave can be adjusted to achieve the selected exit targets e.g. moisture content, color, hardness or texture. When the process achieves steady state continuous running, the conveyor belt and microwave power are simultaneously stopped at the point where a full food slice has just fully entered the heating chamber. The cavity is opened and samples are removed at each point along the belt for laboratory moisture analysis. Each point along the belt is assigned a time value based on the operating conditions used for the test. Typically, six replicates of this experiment per food product per process conditions produces sufficiently precise experimental results. Optionally, during this experiment the temperature profile may also be measured.

A knowledge of the temperature and moisture content of starch or a carbohydrate can assist in predicting transition points with reference to scientific literature or can be used to influence and control the chemical reactions that occur in the food product during processing. When the method disclosed is used to study chemical reactions in food products additional functionality such as hot air for ambient temperature control or an instant reaction quenching method (for example, cold carbon dioxide gas) may be added to the appropriate stage of the microwave oven chamber.

The percentage moisture loss determined over time by laboratory analysis is converted to a dry basis rate of moisture loss. Dry basis moisture loss makes any transitions in drying rates more obvious. The product or process developer can then apply linear regressions to obtain the best-fit lines and therefore drying rates per phase. The product developer can expect to achieve linear correlations with $r^2>0.8$ and typically $r^2>0.9$ with the potential for phase 1 and 2 to approach $r^2=1.0$ for precisely orchestrated experiments. For a potato based food slice dried to less than 10% moisture two transitions and three drying phases may be determined. By way of example only, potato starch transition points may nominally be expected at the end of phase 1 at dry basis moisture content around 0.8 to 1.2 but typically around 1.0 (50% water) for native potato slices and end of phase 2 at dry basis moisture contents between 0.10 and 0.50 but typically around 0.25 (20% water) for native potato slices. For this method, the drying process may be considered complete at dry basis moisture of 0.05 (around 5% water content) In this case, the moisture content refers to the average moisture content for the food slice noting that due to the nature of drying processes the food slice may contain a moisture gradient.

Through iterative study or process, manipulation of these drying phases will enable the sensory properties of a fried and other food products to be closely simulated in order to obtain a desired end product. Sensory properties can be evaluated using well known consensus or blind panel techniques. Where basic cooking parameters (moisture, time) are known, this information can be used to reduce the number of iterations. Alternatively, if a full dehydration curve of sufficient accuracy is known or can be determined for the food product and process under investigation, this can be quantified and accurately simulated by determining the microwave power required to match the water removal rates of the cooking system used, thus reducing iterations.

A belted or rotary microwave can be used for the explosive dehydration step 200. A belted microwave known from frozen meat and fish applications and available commercially from Ferrite, Inc. of Nashua, N.H., USA can be used. Belted microwaves either as single or multiple cavities are most suited to food slices that are sheeted, stamped or otherwise deposited in an orderly manner onto a moving belt. Rotary microwaves are most suited to food slices presented in a random manner to the explosive drying step 200 or where product sticking is not a concern. Rotary microwaves are available in other industries such as the ceramics industry, as illustrated by U.S. Pat. No. 6,104,015 and for "microwave absorbent materials" as illustrated by U.S. Pat. No. 5,902,510 and can be constructed for use under vacuum as illustrated by U.S. Pat. No. 6,092,301 for tanning. Rotary microwaves are not promoted for use in food products but can be used in this instance.

One advantage of using a rotary microwave is that food slices can fold as the slices dehydrate and transition from the rubbery state into the glassy state. As a result, the dehydrated slices have random folds thereby mimicking the appearance of traditionally fried snacks. An important feature of rotary microwave drying is that it avoids the need to partially separate or singulate the food slices prior to explosive drying which is a complicated operation and normally required to ensure slices do not stick together during drying on a belt. Therefore, a further advantage to a rotary microwave oven is that the food slices can be explosively dehydrated in a relatively dense deep bed configuration whilst being continuously agitated. The tumbling action maintains individual slice separation and avoids slices sticking together without requiring a large, uneconomic footprint that would be needed to keep the slices separated in a monolayered or partially monolayered belt drying operation. A further advantage of rotary drying is to induce a more familiar curled shape to the finished chip, similar to that found in conventionally potato and corn chips.

In one embodiment, a rotary microwave that is suitable for snack food applications is constructed in either batch or continuous form. In its simplest form, a rotating drum that will transport the food slices during drying is enclosed in an external cavity. The external cavity can be built to any geometry including, but not limited to square, triangular, pentagonal, hexagonal or parallelogram. A circular cavity confers the opportunity to minimize the volume of the system by accommodating a concentric product transport drum or acting as the rotating product transport drum itself. Food slices are fed into the cavity through a microwave choke equipped with a transport belt or vibrating conveyor and can be removed by similar means or by free fall through a suitable choke.

In alternative embodiments, other novel microwave designs may be utilized including, but not limited to, cavities that transport slices on helical conveyors, multi-pass conveyors, vertical trays, or accept free falling slices under gravity with or without counter air flows. In one embodiment, steam is added near the end of the drying cycle when the moisture content is low to assist in avoiding product scorching. Further, one or more additional mediums selected from hot air, steam, superheated steam, radio frequency, and infrared radiation can be used to assist the explosive dehydration in the microwave.

Delivering the desired drying rates can be achieved in a variety of different microwave applicators. Specialist applicators such as the meander apparatus for potato chip manufacture disclosed by Sprecher in U.S. Pat. No. 5,298,707 may achieve the target drying rates but present significant complexity when it comes to building a commercial scale system (typically 50 kg/hr and above). Therefore a multimode cavity is preferred for use at commercial scales for reasons including design simplicity, high power handling capability and relative cost. For example, The Ferrite Company Inc. (Nashua, USA—www.ferriteinc.com) sell bacon cooking lines based on multimode cavities measuring 1.3 m wide, 3.7 m long and 0.8 m high, with up to 150 kW microwave generator power at 915 MHz per cavity. These cavities may be installed in drying trains of, for example, six or more units.

Delivering the desired dehydration rates in food slices is possible in other applicator types such as monomode, slotted line, meander, fringing field, phase controlled (e.g. EP 792085), but these cavities do not deliver economic scalability as easily or as advantaged for snack food manufacture as with multimode.

For example, monomode applicators have width limitations (e.g. 15 cm at 896 MHz for WR975 waveguide), require a conveyor feed (therefore cannot tumble food slices) and the single high intensity mode may not deliver uniform heating for foodstuffs such as potato slices. In contrast, those skilled in the art will appreciate that various designs can be implemented within multimode applicators that will deliver effective and efficient drying of food slices and that well designed multimode oven cavities can be tailored to uniform drying of particular food slices.

Multimode oven cavities can be designed for uniformly presented and deposited food slices of even weight that are suitable for monolayer transport through a belted cavity. Equally multimode ovens can be designed for non-uniform, randomly presented food slices of variable weight (for example potato slices from an Urschell CC slicer) that are very difficult to singulate and monolayer for uniform presentation to the microwave field. In summary, multimode provides the greatest flexibility in designing a process to suit the product.

In the latter case, where it is complex or inefficient to effectively monolayer the food slices, multimode oven cavities can be built for deep bed transport of food slices, meaning the food slices are transported with continuous, controlled agitation in non-continuous non-intimate contact with each other, for example in a tumbling action. A cavity designed with this functionality maximizes the number of slices that can be transported in a given area which translates to higher throughput per area of plant and will minimize food slices sticking to each other, enables steam escape from both sides of the slice and can induce a more natural curl appearance to the finished chip. A further benefit is the reduced equipment footprint compared to an oven cavity that relies on monolayer, particularly of randomly presented food slices which causes belt loading to be particularly low to ensure no prolonged slice to slice contact that could lead to adhesion between slices during the drying step.

Preferred methods to achieve deep bed transport through tumbling action have been categorized as rotary microwaves and include, but are not limited to, using what Applicants refer to as Catenary Belt, Rotating Drum, and Rotating Cavity microwave ovens designs. Each of these designs is discussed below.

Figure 7:
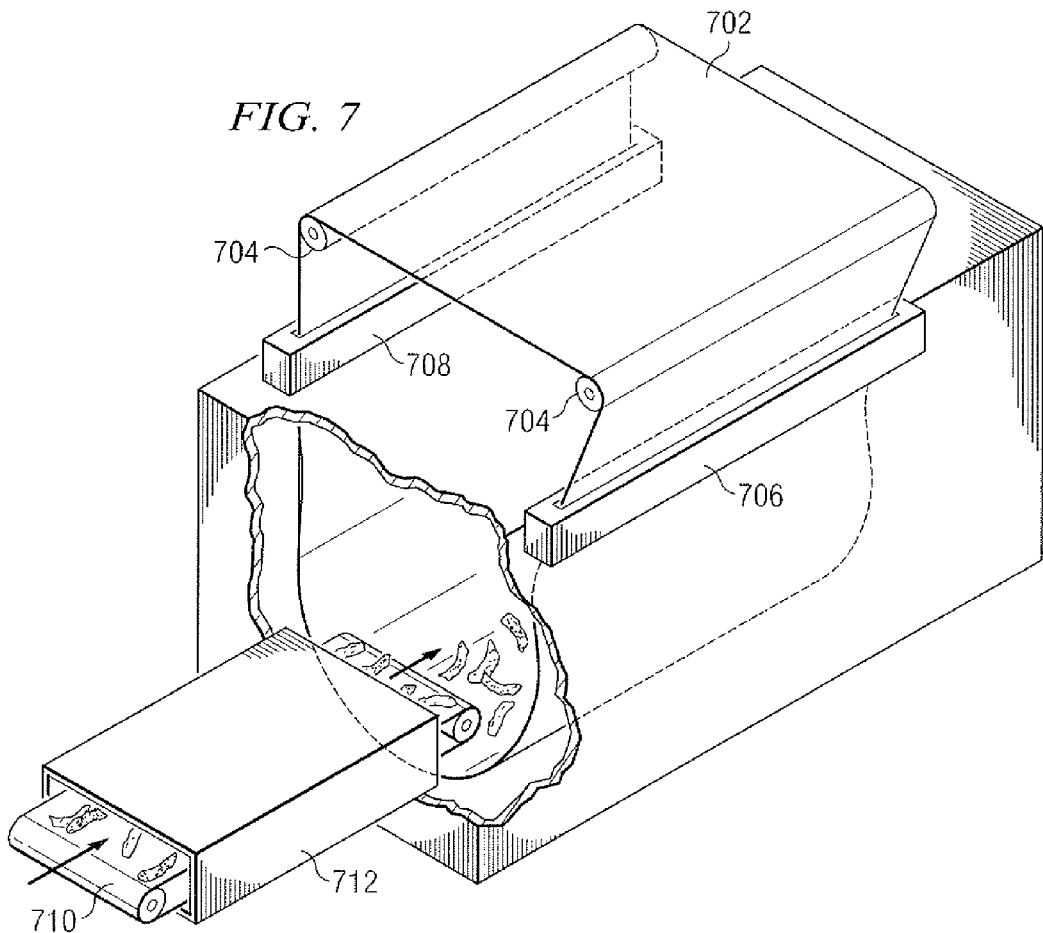
FIG. 7 is a schematic perspective representation of one embodiment of the catenary belt microwave described herein with a cutaway showing the interior of the microwave cavity.
Figure 8:
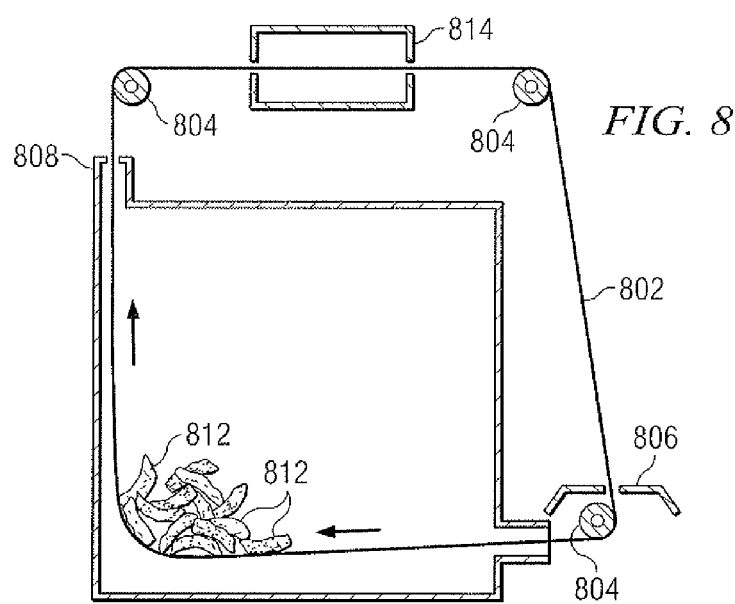
FIG. 8 is a schematic cross-section representation of an alternative embodiment of the catenary belt microwave described herein.

A Catenary Belt design is a static multimode cavity or enclosure with a modular polymer belt (for example Intralox) inclined a few degrees in the direction of product travel. Two different embodiments of the Catenary Belt design are shown in FIGS. 7 and 8. FIG. 7 is a schematic perspective representation of a Catenary Belt microwave unit wherein the belt 702 enters the microwave cavity (the "enclosure") at a microwave choke 706 located at the top of the unit. FIG. 8, on the other hand, is a cross-section view of an embodiment wherein the belt 802 enters the microwave cavity through a choke 806 located near the bottom of the unit.

Referring to FIG. 7, the modular belt 702 (also referred to by Applicants to reflect this embodiment as the "Catenary Belt") is routed over two rollers 704, at least one of which is a drive roller which drives the modular belt 702 into the microwave cavity. The modular belt 702 enters the microwave cavity through a microwave choke 706. Product enters the microwave cavity by virtue of a conveyor 710 through a microwave choke 712. Although not shown in the drawing, product exits the unit through a similar conveyor and microwave choke at the rear of the unit. The nodular belt 702 exits the microwave cavity though another microwave choke 708 located at the top of the unit. This particular unit would also have some type of belt cleaning apparatus, usually situated between the two rollers 704, but is not illustrated in FIG. 7.

Referring to the cross-section view shown in FIG. 8 of a second embodiment, again the modular belt 802 is routed over at least two, and in this instance three, rollers 804, with at least one of them being a drive roller. The modular belt 802 enters the static microwave cavity or enclosure through a microwave choke 806 near the base of the unit. Product 812 can be seen tumbling on one corner of the modular belt 802 in a deep bed configuration. This tumbling is induced as the belt travels towards an exit microwave choke 808. Also depicted in FIG. 8 is a belt cleaning unit 814.

The belt loci within the cavity in a Catenary Belt design effectively simulate the quadrant of food slice contact surface formed by a rotary drum. Modular belts are advantaged because they can be made to form effective radii or arcs by control of the size of their catenary sag, construction of individual belt segments, external drive locations and feed points through the microwave cavity. The advantage of this design is to drive the belt 702, 802 externally to the cavity and to ensure that no polymer part remains within the cavity for more than a few seconds, which therefore enables continuous in-line belt cleaning to remove build-up of product debris and dielectric coatings deposited from the food slices.

A Rotating Drum design is a static multimode cavity with a rotating drum inclined a few degrees in the direction of product travel enclosed therein. The drum is constructed at least in part of microwave and vapor transparent materials to allow the food slices therein contained to be heated directly by microwave energy and for steam to escape. The drum can be mounted on a drive system internal to the cavity/enclosure or can be suspended in the cavity/enclosure and driven from outside the cavity/enclosure via the suspension mechanism.

A Rotating Cavity design is a multimode cavity that acts to both contain the microwave field and to transport the product. The cavity/enclosure is mounted on an external drive system, similar to rotary hot air dryers known within industry, and the whole cavity/enclosure is rotated between static end plates. Thus, this embodiment comprises a rotating enclosure, as opposed to the static enclosures of the two previous design examples.

Figure 9:
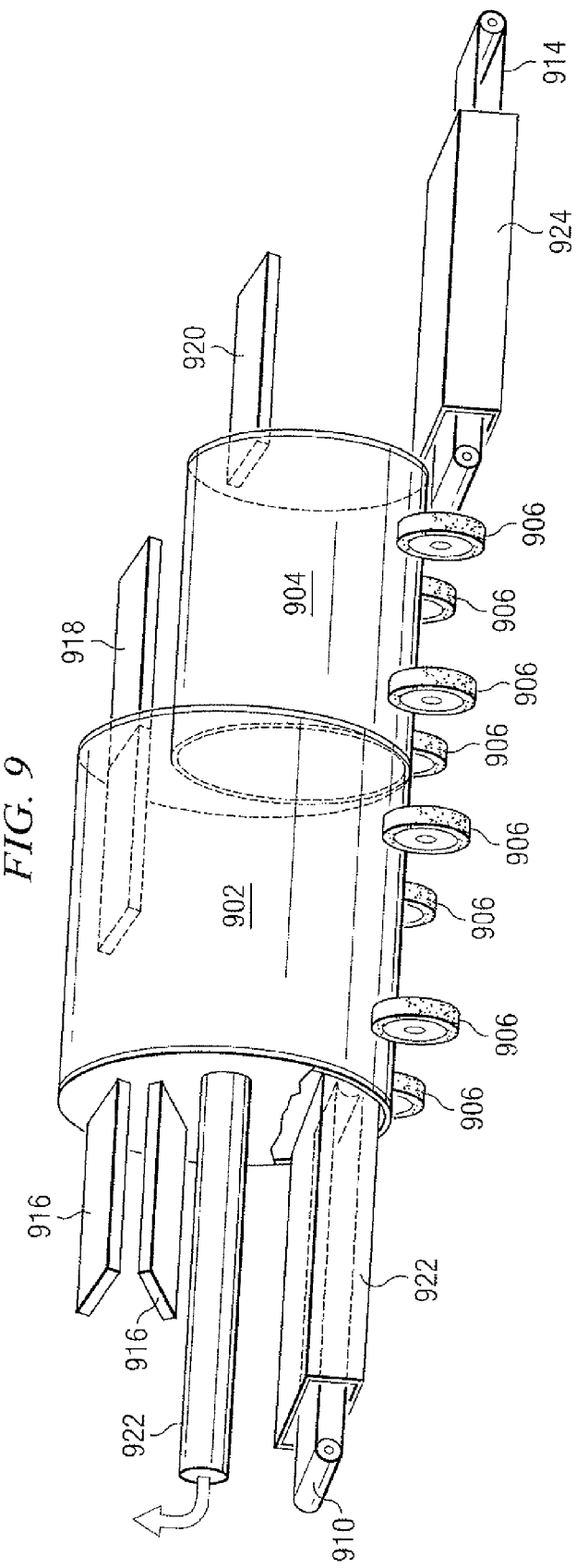
FIG. 9 is a schematic perspective representation of the rotating cavity microwave oven described herein.

FIG. 9 is an illustration of a two-cavity embodiment of the Rotating Cavity microwave unit. This unit comprises a first cavity/enclosure 902 and a second cavity/enclosure 904 that both rotate on, and are driven by, drive wheels 906 that are external to each of the cavities 902, 904. One or more wave guide feeds 916, at different orientations, can be used to control cross-talk between microwave signals. One or more microwave feeds 918 can penetrate into the cavity as well, to allow more controlled delivery of microwave energy. In a preferred embodiment, a duct 922 communicates with the cavities in order to facilitate hot air feed and/or steam extraction. This duct 922, in a preferred embodiment, is a polymer sleeve insert. At least one separate wave guide feed 920 provides microwave energy specific to the second cylinder 904. An end-feed conveyor 910 routed through a microwave choke 922 is used to introduce product into the first cavity. As the cylinders 902, 904 rotate and tumble the product within the cavity, a slight incline on the entire unit causes a gravity feed of the product from the first cylinder 902 into the second cylinder 904. Product is then removed from the second cylinder 904 by another conveyor 914 that also passes through a microwave choke 924.

Each design (Catenary Belt, Rotating Drum, and Rotating Cavity) benefits from longitudinal flights to lift and tumble the product slices on the walls of the drum, cavity or belt. While this is sufficient to control the tumbling action and transport of the food slices, additional features may also be added, for example an internal helix of fixed or variable pitch in a rotating cavity or drum can improve control of residence time. Any of the designs may be configured as singlezone or multizone drying trains and the drying efficiency of any of the microwave ovens may be assisted by hot air, steam, superheated steam, infrared or other methods of heat and energy transfer.

Each design has different advantages and challenges when considered for commercial production. Static cavities, such as is found in the Catenary Belt embodiment and the Rotating Drum embodiment, allow power feed locations to be selected over a very large area of the cavity and preferred feed arrangements are well known in the art. This is important for large-scale installations that may draw 1 MW or more per cavity. Rotary cavities restrict the area available for microwave power inputs. The static end plates provide the greatest area but present additional design complexity, for example: avoidance of cross-coupling of microwave fields between multiple feeds in close proximity, mechanical design to allow the static end plate to act as a door to allow personnel access to the cavity for cleaning, maintenance etc.

On the other hand, a Rotating Drum stays within a static cavity during processing and will be subjected to high temperatures (typically 100° C. and over) from contact with the hot food slices, steam generated by the food slices, and possibly externally applied hot air and/or steam to aid the drying process. Additionally the drum can become coated with dielectric materials (for example oil, starch, sugar, salt etc.) picked up from contact with the food slice. The drum is made at least in part from microwave transparent components for which polymer is typically used for reasons including mechanical performance, microwave transparency, cost and ability to be machined to desired form. When polymer inside a microwave field becomes coated with dielectric materials, there is a significant risk that the coating will self-heat leading to damage or melting of the polymer, which is more likely with the high microwave power densities required to achieve the initial drying rates disclosed herein than in conventional microwave drying processes such as bacon drying. To minimize the risk of damage to polymer parts within the microwave cavity, the polymer must be thoroughly cleaned on timescales typically more frequent than traditional food production cleaning schedules would ideally allow (for example daily rather than weekly in snacks manufacture). One way to improve this situation is to use a Catenary Belt running through a static cavity, which enables a polymer transport construction to be used in the microwave field while also providing the opportunity for continuous cleaning, which considerably reduces the risk of damage to the polymer.

A Rotating Cavity overcomes the disadvantages of having to use microwave transparent materials or polymers inside the microwave oven cavity and eliminates any complex internal architecture that may be needed to support, drive or remove drums or belts for cleaning and maintenance. While it is possible to construct a rotating cavity with polymer linings to minimize or fully eliminate sticking of food slices to the cavity walls and those linings can have surface finishes applied to reduce effective surface contact area, the preferred embodiment of the rotating cavity design uses the metal walls to tumble slices and therefore eliminates maintenance and cleaning issues associated with polymer. The effective contact surface area between wall and food slice can be reduced using textured finishes such as dimples or grooves, or applying holes or slots in the food slice contact metal surface itself in order to make the metal surface of the rotary drum less sticky to food slices. A suitable Rotating Cavity material is stainless steel 6WL provided by RIMEX, although other microwave reflective materials may be used including but not limited to metals such as Aluminum. The preferred embodiment is for such surface to comprise a non-stick metal surface. The food slices are tumbled in the microwave field by the rotating action of the cavity. The cavity can be rotated using drives external to the microwave field.

A disadvantage of rotary cavities is the complexity of the rotary jointed choke that is required between the rotating cylinder and static end plates. Static end plates are preferred to facilitate ingress and egress of food slices on linear conveyors, microwave power via rigid waveguides and hot air and/or steam via conventional pipe work.

As shown in FIG. 9, multiple cavities may be placed in series to create a multizone dryer as described earlier in relation to the 3 phase drying curve. It should be understood that a multizone dryer can be created from both multiple rotating cavities, and multiple static cavities, or a combination thereof or by combining linear, belted cavities with a rotary form. One cavity may be used for a selected part of the drying curve only, for example half of phase one, phase one only, or phase one and two together. In one embodiment, multiple cavities may be used for the first phase where power requirements are highest. Advantages have already been cited for multizone configurations using more than one microwave cavity, including improved control of power distribution, power tuning and consistency of final product since the microwave cavity can be sized to the intended product loading, dielectric properties or other drying characteristics. It will be appreciated by those skilled in the art that there are many approaches to construct multiple multimode cavities, for example, by baffling or otherwise partitioning a large single multimode cavity into two or more zones. The degree of isolation required between baffled zones within a single multimode cavity or multiple rotating multimode cavities (which are linked by rotary jointed chokes and not internally choked) or combinations thereof may be high (e.g. 20 dB or more) to generate the drying rates required to achieve the preferred product attributes, or low (e.g. around 10 dB) if a single drying rate zone is split up into multiple cavities to assist power delivery. Alternatively, the static and/or rotary single or multiple multimode cavity(s) may be used without isolation such that the selected drying conditions (e.g., water removal rate, moisture content entering and exiting microwave cavity) determine the preferred drying curve.

Baffling may be preferred where multiple static cavities are used in order to minimize product transfer distances through full chokes, which may occur at critical points in the drying curve. While baffles can be inserted between sections of rotating drums or rotating cavities, rotating cavities with no other microwave containment also require a rotary choke between rotary chambers. Such rotary jointed chokes are well known, for example in radar applications, but are novel in this application since they have not been used for rotary cavities of diameters up to around 3 m that are suitable for handling commercial scale snack production volumes. A notable advantage of rotary chokes is the avoidance of large transfer zones, which may for example occur through discharge chokes, outlet conveyors and inlet conveyors between static multimode cavities. Such transfers can create opportunities for food slices to be inadvertently held up in the microwave field. The rotary choke itself may only be a few centimeters wide and the product flow across the choke acts to clear slices should any become held up.

An important design consideration for tumbling of food slices (whether by drum, rotating cavity or modular belt) is the balance between inertial and gravitational forces to achieve sufficient non-intimate contact with minimal physical damage. Trivial cases are when rotational speeds are too high, food slices will stick to the contact surface through centrifugal forces; if the rotational speed is too low, food slices will slide against the contact surface. Suitable conditions for delivery of preferred product attributes depend largely on drum diameter (or effective diameter if the modular belt design previously described is used) and rpm. Additionally, use of longitudinal flights, weirs, spirals or other devices which assist the tumbling action of the food slices have a significant impact on delivery of preferred product attributes. One useful approach to maintain optimum tumbling conditions (during scale-up or when using multiple rotating cavities of different diameters) is use of rpm, circumferential speed and the Froude number. The Froude number (Fr) is a non-dimensional scale-up parameter defined as $N^2 D/g$ for rotating drums, where N is drum rpm, D is the diameter (m) and g is gravity (m/s).

Referring back to FIG. 1, after the explosive dehydration step 200, the slices can be finish dried 300 to a moisture content of less than about 3% by weight of potato solids in the finished chip. A hot air dryer having a belt configuration operating at about 80° C. to about 140° C. or other suitable methods can be used alone or in combination. Other suitable finish drying 300 methods include one or more drying methods selected from hot air, infrared, radio frequency, and microwave. The slices can optionally be salted or seasoned 400 by methods well known in the art. An oil spray step can be used after the finish dry step 300 either before or in conjunction with the seasoning step 400 to tailor the final oil content and assist with seasoning adhesion.

The above unit operation examples are provided by way of illustration and not by way of limitation. Further, those skilled in the art will appreciate that many of the processes discussed with the potato slice embodiment above can be used with other food slices, including, but not limited to, beets, beans, carrots, bananas, apples, strawberries, lentils, wheat, rice, parsnips, Jerusalem artichokes, potatoes, noble nuts, peanuts and coated peanuts, masa, and corn. Starchy tubers are especially preferred. Further, those skilled in the art will recognize that if processing steps are applied to other raw foods besides potatoes, such foods may require processing times and temperatures different than those disclosed. However, such embodiments are intended to be covered by the claims scope of the present invention.

Doughs, in accordance with the present invention, can comprise entirely fresh raw materials or a mixture of fresh and dried raw materials such as native or modified starches. Additional ingredients including, but not limited to, seasoning, oil, nuts, seeds, pulses, and other inclusions such as fresh or dried herbs and spices may also be added to a dough. One advantage of the invention is that relatively fragile doughs that may not be sufficiently cohesive for frying can be processed and dried using the continuous belt microwave or batch embodiments of this invention.

There are several advantages provided by the present invention when used with dough based food slices. First, the process allows the nutritional profile of the product to be controlled. For example, oil is added in controlled amounts either before and/or after the primary drying step. One advantage of adding oil before the explosive dehydration is that it will be heated for a short period toward the end of the explosive drying and this develops fried-flavor characteristics. Another advantage provided by the present invention is the processing temperatures. Because the processing temperatures are relatively low throughout the food slice (e.g. can be maintained at about 100° C. even on the outer skin) when compared to conventional hot oil frying, and the processing times are relatively short, e.g. less than about 60 seconds is achievable even for high moisture doughs, less of the inherent nutrition is expected to be destroyed during the drying process and natural flavor characteristics of the substrate or added ingredients derived from nuts, seeds, pulses, herbs, spices etc. are retained. Similarly, nutritionally desirable vitamins, essential fatty acids or phytonutrients inherent in the added ingredients or directly added for fortification are expected to be retained. Further, the low temperature and short drying time benefits the use of natural ingredients if added as flavorings or seasonings in dough-based embodiments. This drying method and profile also helps to ensure that any natural ingredients added can deliver an authentic, vibrant flavor to a finished product because the natural ingredients added for reasons of flavor, texture or fortification, can be expected to retain a significant portion of their inherent nutritional and organoleptic value without losing desirable aroma, flavor, color or phytonutrient compounds. Consequently, the present invention provides a way to provide a balanced nutritional profile using real food ingredients, such as nuts, seeds, herbs, and spices or cheese. Nuts that can be used include, but are not limited to almonds, peanuts, walnuts, pecans, and brazils. Seeds that can be used include, but are not limited to pumpkin, sunflower, sesame, poppy, and squash. Pulses and legumes that can be used include but are not limited to peas, chickpeas, lentils, pinto beans, kidney beans, broad beans, butter beans, soy beans, or black eye beans. Herbs and spices that can be used include but are not limited to basil, bay leaves, coriander, cumin, garlic oregano, paprika, parsley, and pepper, just to name a few. Natural oil extracts can also be used either prior to or post primary drying.

Advantageously, because the real food ingredients can be added after any blanching step, and because of the relatively lower temperatures and short dwell time during dehydration, the flavor profiles are more pronounced than prior art snacks that are cooked in high temperature ovens or fryers. Further, because there is no oil or water medium, the nutrient content and flavor profiles do not leach out. Consequently, unlike the prior art, the present invention provides a way to formulate natural flavor profiles without the use of artificial ingredients.

While the invention has been particularly shown and described with reference to a preferred embodiment, it will be understood by those skilled in the art that various changes and form of detail may be made therein without departing from the spirit and scope of the invention.

What is claimed is:

1. A method for cooking in a non-oil medium a food product, wherein the end product mimics the organoleptic characteristics of a fry-cooked product, said method comprising the steps of:
   a) determining a dehydration profile corresponding to the fry-cooked product;
   b) preparing a food product for cooking;
   c) cooking in a non-oil medium the food product at a controlled rate, wherein said controlled rate is adjusted to mimic the dehydration profile of step a) for the food product of step b).

2. The method of claim 1 wherein the cooking of step b) comprises microwave cooking 3. The method of claim 2 wherein the controlled rate of step c) comprises a first microwave power step and a second microwave power step.

4. The method of claim 1 wherein the fry-cooked food product of step a) consists of a starting food material selected from the group consisting of potato, sweet potato, yam, beet, parsnip, carrot, peas, chickpeas, lentils, pinto beans, kidney beans, broad beans, butter beans, black eye beans, soy beans, oats, wheat, sorghum, rice, millet, rye, and barley.

5. The method of claim 1 wherein the fry-cooked food product comprises dough prior to frying.

6. The method of claim 5 wherein said dough comprises potato.

7. The method of claim 5 wherein said dough comprises corn.

8. The method of claim 1 wherein step b) comprises a blanching step.

9. The method of claim 8 wherein said blanching step comprises a wet blanch.

10. The method of claim 9 wherein said wet blanch comprises a medium comprising water at about 60° C. to about 100° C., and further wherein said blanching step occurs for between about 50 seconds and about 3 minutes.

11. The method of claim 9 wherein step b) further comprises an oil addition step after the blanching step.

12. The method of claim 11 wherein the oil is conditioned prior to use in step b), thereby increasing the fried characteristics provided by the added oil.

13. The method of claim 8 wherein said blanching step comprises an oil blanch.

14. The method of claim 13 wherein said blanch step comprises a warm oil dip of about 60 to about 120 seconds in duration and wherein said food product is brought to a temperature of about 60° C. to about 99° C. during said blanch.

15. The method of claim 13 wherein step b) further comprises a de-oiling step after the blanching step.

16. The method of claim 15 wherein the food product is cooled prior to or following the de-oiling step.

17. The method of claim 16 wherein step b) further comprises an oil addition step after said de-oiling step.

18. The method of claim 15 wherein the food product is pre-dried following the de-oiling step.

19. The method of claim 8 wherein said blanch step comprises a flash fry for about 7 seconds to about 20 seconds in oil having a temperature of about 120° C. to about 180° C.

20. The method of claim 8 wherein said blanch step comprises a flash fry for about 15 seconds to about 20 seconds in oil having a temperature of about 150° C. to about 160° C.

21. The method of claim 1 wherein step b) comprises adding oil to said food product prior to step c).

22. The method of claim 21 wherein the oil is conditioned prior to use in step b), thereby increasing the fried characteristics provided by the added oil.

23. The method of claim 1 wherein step b) comprises adding food ingredients to said food product.

24. The method of claim 1 wherein the controlled rate of step c) corresponds to moisture removal between starch transition points.

25. The method of claim 1 wherein the dehydration profile is determined by measuring the moisture level in a fry-cooked product at a plurality of points during the time that the fryer-cooked product is fried.

26. The method of claim 1 wherein the dehydration profile is determined by an iterative process, wherein said iterative process produces the desired end product.

27. The method of claim 1 wherein said controlled cooking rate of step c) comprises a first dehydration rate of between about 0.02 grams of moisture per gram of solid per second and about 0.2 grams of moisture per gram of solid per second, and wherein further said controlled cooking rate of step c) comprises a second dehydration rate of between about 0.004 grams of moisture per gram of solid per second and about 0.08 grams of moisture per gram solid per second.

28. The method of claim 1 wherein said food product is par-dried to a halfproduct, and wherein further said halfproduct is packaged for later finish drying by the consumer of said product.

29. The method of claim 28 wherein said food product is par-dried to below its starch melting point.

30. The method of claim 28 wherein said food product is par-dried to below its glass transition point.

* * * * *